United States Patent Office 3,496,184
Patented Feb. 17, 1970

3,496,184
CYCLOPROPYLMETHOXY-3-QUINOLINE
CARBOXYLIC ACIDS AND ESTERS
Renat Herbert Mizzoni, Long Valley, and George
De Stevens, Woodland Park, Summit, N.J., assignors
to Ciba Corporation, Summit, N.J., a corporation of
Delaware
No Drawing. Continuation-in-part of applications Ser.
No. 736,962, June 14, 1968, and Ser. No. 770,426,
Oct. 24, 1968. This application Mar. 18, 1969, Ser. No.
808,333
Int. Cl. C07c 33/48; A61k 21/00
U.S. Cl. 260—287          20 Claims

ABSTRACT OF THE DISCLOSURE

Cycloaliphatyloxy- or -mercapto-4-hydroxy-3-quinoline-carboxylic acids, e.g. those of the formula

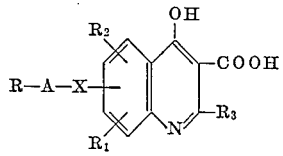

R=cycloaliphatic radical
$R_{1,2}$=H, alkyl, alkenyl, aralkyl, free, etherified or esterified OH or SH, $CF_3$, $NO_2$ or amino
A=direct bond or aliphatic radical
$R_o$=H or alkyl
X=O or S functional derivatives, tautomeric N-derivatives and salts thereof, exhibit anticoccidial effects.

CROSS-REFERENCES TO RELATED APPLICATIONS

This is a continuation-in-part of application Ser. No. 736,962 filed June 14, 1968 and of application Ser. No. 770,426 filed Oct. 24, 1968 (now abandoned), which latter is a continuation-in-part of application Ser. No. 753,731 filed Aug. 19, 1968, which in turn is a continuation-in-part of application Ser. No. 669,730 filed Sept. 22, 1967 (now abandoned), which in turn is a continuation-in-part of application Ser. No. 661,541 filed Aug. 18, 1967 (now abandoned), which in turn is a continuation-in-part of application Ser. No. 650,655 filed July 3, 1967 (now abandoned), which in turn is a continuation-in-part of application Ser. No. 629,085 filed Apr. 7, 1967, which in turn is a continuation-in-part of application Ser. No. 583,101 filed Sept. 29, 1966 (now abandoned).

SUMMARY OF THE INVENTION

The present invention concerns and has for its object the provision of new cycloaliphatyloxy- or -mercapto-4-oxygenated-3-quinolinecarboxylic acids, more particularly of those represented by Formula I, (defining said compounds in their tautomeric form)

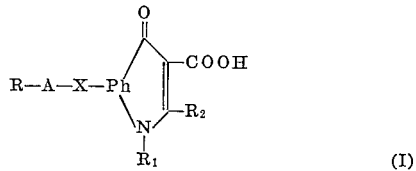

in which R is a cycloaliphatic radical, A is a direct bond or a bivalent aliphatic radical, X is oxygen or sulfur, Ph is a 1,2-phenylene radical substituted in one of the remaining four positions by R—A—X, $R_1$ is hydrogen, lower alkyl, alkenyl, free, etherified or esterified hydroxy- or carboxyalkyl, aminoalkyl, R—A or aralkyl and $R_2$ is hydrogen or lower alkyl, of their esters, amides, hydrazides, the nitrile and salts, of corresponding veterinary compositions, feedstuffs and feedstuff additives, as well as of methods for the preparation and application of these products. Said compositions, feedstuffs, additives or drinking water containing the compounds of the invention alone, or in combination with other therapeutically valuable agents, are useful as growth promoters, as well as in the control of coccidiosis, which latter is of utmost importance for the poultry raising industry.

DESCRIPTION OF THE PREFERRED EMBODIMENTS

The term "lower," referred to above and hereinafter in connection with organic radicals or compounds respectively, defines such with up to 7, preferably up to 4 carbon atoms. The term "higher" defines such radicals or compounds with 8 to 20, preferably 8 to 16 carbon atoms. Accordingly, lower alkyl, which may be straight or branched and connected with the remaining molecule in any position, is represented, for example, by methyl, ethyl, n- or i-propyl, -butyl, -pentyl, -hexyl or -heptyl. A higher alkyl may also be straight or branched and connected in any position and is represented, for example, by 1- or 2-n-octyl, -nonyl, -decyl, -undecyl, -dodecyl, -tetradecyl, -hexadecyl, -octadecyl or -dodecyl, 3,7-dimethyl-1- or 3-n-octyl, 3,7,11-trimethyl-1- or 3-n-dodecyl. Lower alkenyl is, for example, allyl, methallyl or but-2-enyl, and higher alkenyl, for example, citronellyl, geranyl, neryl, linalyl, farnesyl, n-9-octadecenyl or phytyl.

A cycloaliphatic radical representing R, more particularly contains 3 to 8 ring-carbon atoms and preferably stands for cycloalkyl, primarily with 3 to 6 ring-carbon atoms, or cycloalkenyl, primarily with 5 to 6 ring-carbon atoms and up to 2 double bonds, such as cyclopropyl, cyclobutyl, cyclopentyl or cyclohexyl, but also cycloheptyl or cyclooctyl; 1-, 2- or 3-cyclopentenyl or -cyclohexenyl, 2,4-cyclopentadienyl or 2,5-cyclohexadienyl, but also 2-cyclopropenyl, 1-, 2- or 3-cycloheptenyl, 2,6-cycloheptadienyl or 2-cyclooctenyl.

Said cycloaliphatic radical R, as well as the 1,2-phenylene radical Ph, is unsubstituted or substituted, for example, by aliphatic or araliphatic radicals and/or free, esterified or etherified hydroxy groups, R also by aromatic radicals and Ph furthermore by trifluoromethyl, nitro and/or amino groups. Accordingly, the above-mentioned cycloaliphatic radical R may be substituted, preferably by up to 4 lower alkyl groups, e.g. those mentioned above, but also by ($R_3$-phenyl)-lower alkyl, $R_3$-phenyl, hydroxy, lower alkanoyloxy, e.g. acetoxy or propionyloxy, primarily halogeno, e.g. fluoro, chloro or bromo, lower alkoxy, e.g. methoxy, ethoxy, n- or i-propoxy or -butoxy, ($R_3$-phenyl)-lower alkoxy, $R_3$-phenoxy, hydroxy-lower alkyl, lower alkanoyloxy-lower alkyl, halogeno-lower alkyl or lower alkoxy-lower alkyl groups, wherein $R_3$ stands for hydrogen, lower alkyl, lower alkoxy, halogeno, trifluoromethyl, nitro or di-lower alkylamino, e.g. dimethylamino or diethylamino.

Preferred substituted cycloaliphatic radicals R are exemplified by 1- or 2-methyl-cyclopropyl, 1,2-, 2,2-, or 2,3-dimethyl-cyclopropyl, 1,2,2- or 1,2,3-trimethyl-cyclopropyl, 2,2,3,3-tetramethyl-cyclopropyl, 2-ethyl-cyclopropyl, 2,2,3-trimethyl-cyclobutyl, 3-ethyl-cyclobutyl, 2- or 3-methyl-cyclopentyl, 2,5- or 3,4-dimethyl-cyclopentyl, 2-, 3- or 4-methyl-cyclohexyl, 2,3-, 2,4- or 3,5-dimethyl-cyclohexyl, 2,4,6-trimethyl-cyclohexyl- 1- or 2-benzyl-cyclopropyl, 1- or 2-phenyl-cyclopropyl, 2-chloro-cyclopropyl, 2,2 - dichloro - cyclopropyl, 3,4-dichloro-cyclopentyl, 2-ethoxy-cyclopropyl, 2-benzyloxy - cyclopropyl, 2-phenoxy-cyclopropyl, 1 - acetoxymethyl - cyclopropyl, 1-chloromethyl - cyclopropyl or 1-methoxymethyl-cyclopropyl, 2- or 3-methyl-2-cyclopentenyl, 4,5-dimethyl-2- cyclopentenyl, 2-, 3- or 4-methyl-1- or 2-cyclohexenyl, 2,4- or 3,5-dimethyl-1- or 2-cyclohexenyl, or 2,4,6-trimethyl-2,5-cyclohexadienyl.

A bivalent aliphatic radical representing A is primarily lower alkylene, preferably such with up to 4 carbon atoms. It may be mono- or polysubstiuted as shown above for the cycloaliphatic moiety. It especially represents methylene, but also 1,1- or 1,2-ethylene, 1,1-, 1,2-, 2,2- or 1,3-propylene, 2-methyl-1,3-butylene or 1,4-butylene.

The 1,2-phenylene radical Ph is unsubstituted in the remaining three positions or substituted therein, for example, by 1 or 2 members selected from lower alkyl, higher alkyl, lower alkenyl, higher alkenyl, ($R_3$-phenyl)-lower alkyl, hydroxy, lower alkanoyloxy, halogeno, lower alkoxy, ($R_3$-phenyl)-lower alkoxy or $R_3$-phenoxy groups which have been illustrated above but also by mercapto, higher alkoxy, lower or higher alkenyloxy, alkylmercapto or alkenylmercapto groups, such as, 1- or 2-n-octyloxy, n-decyloxy, n-dodecyloxy, n-tetradecyloxy or n-hexadecyloxy, allyloxy, methallyloxy or citronellyloxy, methyl-, ethyl- or allylmercapto; lower halo-alkoxy or -alkylmercapto, e.g. 2-chloroethoxy, 3,3,3-trifluoropropoxy or 3 - bromopropylmercapto, ($R_3$ - phenyl) - lower alkylmercapto, e.g. ($R_3$-phenyl)-methyl- or -ethylmercapto, $R_3$-phenylmercapto, the group R—A—X, ($R_3$-phenyl)-lower alkanoyloxy, e.g. benzoyloxy or phenylacetoxy, trifluoromethyl, nitro or amino, preferably di-lower alkylamino or lower alkanoylamino, e.g. dimethylamino or diethylamino, acetylamino or propionylamino.

Of the 1,2-phenylene radicals Ph containing the R—A—X moiety, the following are preferred:

1,2-phenylene,
(lower alkyl)-1,2-phenylene,
(higher alkyl)-1,2-phenylene,
(lower alkenyl)-1,2-phenylene,
(higher alkenyl)-1,2-phenylene,
($R_3$-phenyl-lower alkyl)-1,2-phenylene,
(hydroxy)-1,2-phenylene,
(mercapto)-1,2-phenylene,
(lower alkanoyloxy)-1,2-phenylene,
($R_3$-phenyl-lower alkanoyloxy)-1,2-phenylene,
(halogeno)-1,2-phenylene,
(lower alkoxy)-1,2-phenylene,
(higher alkoxy)-1,2-phenylene,
(lower alkenyloxy)-1,2-phenylene,
(higher alkenyloxy)-1,2-phenylene,
(lower alkylmercapto)-1,2-phenylene,
(higher alkylmercapto)-1,2-phenylene,
(lower alkenylmercapto)-1,2-phenylene,
(higher alkenylmercapto)-1,2,-phenylene,
(halo-lower alkoxy)-1,2-phenylene,
(halo-lower alkylmercapto)-1,2-phenylene,
($R_3$-phenyl-lower alkoxy)-1,2-phenylene,
($R_3$-phenyl-lower alkylmercapto)-1,2-phenylene,
($R_3$-phenoxy)-1,2-phenylene,
($R_3$-phenylmercapto)-1,2-phenylene,
(trifluoromethyl)-1,2-phenylene,
(nitro)-1,2-phenylene,
(di-lower alkylamino)-1,2-phenylene,
(lower alkanoylamino)-1,2-phenylene and especially (R—A—X—)-1,2-phenylene. In said 1,2-phenylene radicals, the R—A—X and additional moiety preferably occupy the 4- and 5- positions therein.

A lower alkyl radical representing $R_1$ and $R_2$ as well as a lower alkenyl, R—A— and aralkyl e.g. ($R_3$-phenyl)-lower alkyl radical representing $R_1$ also, have been exemplified above. The remaining radicals mentioned for $R_1$ can be represented by $R_4$-lower alkyl, wherein $R_4$ stands for hydroxy, lower alkoxy, carboxy or carbo-lower alkoxy, e.g. carbomethoxy or carbethoxy, amino, mono- or di-lower alkylamino, e.g. methylamino, ethylamino, n-propylamino, dimethylamino or diethylamino, lower alkyleneimino or mono-aza-, oxa- or thia-lower alkylene-imino, wherein the hetero-atoms are separated by at least 2 carbon atoms, e.g. ethyleneimino, pyrrolilino, piperidino, piperazino, 4-methyl- or 4-ethyl-piperazino, morpholino or thiamorpholino.

An ester is derived either from the carbovylic acid or Formula I, which is preferably a lower or higher alkyl or aralkyl, e.g. ($R_3$-phenyl)-lower alkyl ester, such as the methyl, ethyl, n-or l-propyl or -butyl, n-decyl, benzyl, 1- or 2-phenethylester thereof; or from the tautomeric 4-phenol, which is preferably a lower alkanoic acid, e.g. acetic, propionic or pivalic acid ester thereof. An amide or hydrazide of said carboxylic acid is either N-unsubstituted, partially or fully N-substituted by lower alkyl or aralkyl, e.g. ($R_3$-phenyl)-lower alkyl groups.

The compounds of this invention possess valuable pharmacological properties. For example, they exhibit growth promoting, antibacterial and antiprotozoal effects. They especially show activity against parasites causing coccidiosis, such as *Eimeria tenella, acervulina, adenoides, agridis, burnetti, hagani, maxima* and *necatrix*. This can be demonstrated, for example, by the growth promoting effect of a feed containing about 0.0001 to about 0.1% of the compounds of this invention, given to chickens during a part of or the whole life span, or by the prophylactic or curative effect of said feed given to chickens 1 to 2 days prior or after their inoculation with sporulated oocysts of said Eimeria strains. Besides the abovementioned utility, the compounds of this invention are also useful intermediates in the manufacture of other valuable products, particularly of pharmacologically active compounds.

Valuable compounds of the invention are those of Formula II

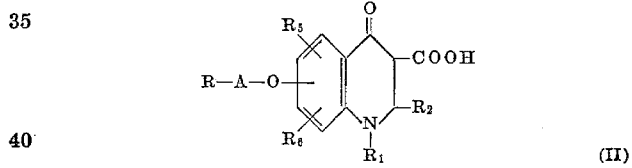

(II)

in which R is 3 to 8 ring-membered ($R_7$)$_n$-cycloalkyl wherein $R_7$ is hydrogen, lower alkyl or halogeno and $n$ the integer 1 or 2, A is a direct bond or lower alkylene, each of $R_5$ and $R_6$ is hydrogen, or both, or preferably one thereof, is lower alkyl, higher alkyl, ($R_3$-phenyl)-lower alkyl, lower alkoxy, higher alkoxy, haloalkoxy with 2 to 7 carbon atoms and at most 3 halogen atoms, ($R_3$-phenyl)-lower alkoxy, $R_3$-phenoxy, ($R_7$)$_n$-cycloalkyl, [($R_7$)$_n$-cycloalkyl]-lower alkoxy, halogeno, trifluoromethyl, nitro or di-lower alkylamino, wherein $R_3$ has the previously given meaning, $R_1$ is hydrogen, lower alkyl, hydroxy-lower alkyl or di-lower alkyl-amino-lower alkyl, wherein the heteroatoms are separated by at least 2 carbon atoms and $R_2$ is hydrogen or lower alkyl, their lower alkyl esters, higher alkyl esters, ammonium, alkali metal, alkaline earth metal or acid addition salts, or lower alkanoic acid esters of the tautomeric 4-phenols. Preferably $R_5$ is hydrogen and R—A—O and $R_6$ occupy the 6- and 7-positions.

Particularly useful are compounds of the Formula III

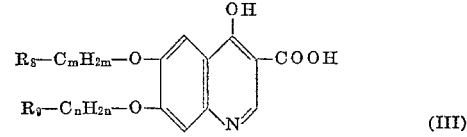

(III)

in which both of $R_8$ and $R_9$ stand for the same 3 to 6 ring-membered cycloalkyl or (lower alkyl)-cycloalkyl group and each of $m$ and $n$ for the same integer from 1 to 4, as well as those in which both of $R_8$ and $R_9$ stand for said cycloalkyl or (lower alkyl)-cycloalkyl group and each of $m$ and $n$ stands for the integer 0, and those in which one of $R_8$ and $R_9$ stands for hydrogen and the other for said cycloalkyl or (lower alkyl)-cycloalkyl group and each of $m$ and $n$ for an integer from 1 to 4, and those in which one of $R_8$ and $R_9$ stands for $R_3$-phenyl and the other for said cycloalkyl or (lower alkyl)-cycloalkyl group and each of $m$ and $n$ for an integer from 1 to 4, and those in which one of $R_8$ and $R_9$ stands for halogeno and the other for said cycloalkyl or (lower alkyl)-cycloalkyl group, the one of $m$ and $n$ present in the haloalkyl moiety for an integer from 2 to 4 whereby the halogen atom is separated from the oxygen atom by at least 2 carbon atoms, and the other for an integer from 1 to 4, and those in which one of $R_8$ and $R_9$ stands for hydrogen and the other for said cycloalkyl or (lower alkyl)-cycloalkyl group, the one of $m$ and $n$ present in the alkyl group for an integer from 5 to 7 or preferably 8 to 16 and the other for an integer from 1 to 4, a lower alkyl or 4-alkanoic acid ester, ammonium, alkali or alkaline earth metal or acid addition salt thereof.

Another group of valuable compounds are those of the Formula IV

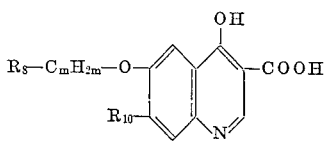

(IV)

in which $R_8$ stands for 3 to 6 ring-membered cycloalkyl or (lower alkyl)-cycloalkyl, $m$ for an integer from 1 to 4 and $R_{10}$ for lower alkyl or di-lower alkylamino, a lower alkyl or 4-alkanoic acid ester, ammonium, alkali or alkaline earth metal or acid addition salt thereof.

Preferred compounds of the invention are those of Formula III, in which both of $R_8$ and $R_9$ stand for cyclopropyl and both of $m$ and $n$ for the same integer from 1 to 4, as well as those of Formula III, in which one of $R_8$ and $R_9$ stands for hydrogen and the other for cyclopropyl, the one of $m$ and $n$ present in the alkyl group for an integer from 1 to 7 or preferably 8 to 16 and the other for the integer 1, as well as those of Formula IV, in which $R_8$ is cyclopropyl, $m$ is the integer 1 and $R_{10}$ is lower alkyl or di-lower alkylamino, a lower alkyl ester, ammonium, alkali metal, alkaline earth metal or acid addition salt thereof.

Of special value are the methyl or ethyl esters of the 6,7-bis-cyclopropylmethoxy-4-hydroxy-3-quinolinecarboxylic acid, the 6-cyclopropylmethoxy-7-n-(octyloxy, decyloxy, dodecyloxy or tetradecyloxy)-4-hydroxy-3-quinolinecarboxylic acid, the 6-cyclopropylmethoxy-7-n-butyl-4-hydroxy-3-quinolinecarboxylic acid or the 7-cyclopropylmethoxy-6-n-(nonyl or decyloxy)-4-hydroxy-3-quinolinecarboxylic acid or their 4-acetic acid esters, which, when given with a balanced diet at a level between about 0.0001 and 0.01%, preferably between about 0.004 and 0.008%, to healthy or infected chicken, (for example, with the above Eimeria strains) cause outstanding weight gain and feed conversion index, as well as an outstanding prophylactic and curative effect.

The compounds of this invention are prepared according to known methods. For example, the process for their preparation consists in (a) ring-closing a reactive functional derivative of a (cycloaliphatyloxy or -mercapto-phenylamino)-alkylidene-malonic acid unsubstituted in one ortho-position, more particularly such of the formula

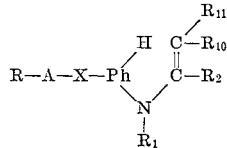

in which each of $R_{10}$ and $R_{11}$ is a functionally converted carboxy group, both containing at least one oxygen atom, preferably a carbalkoxy or carbaralkoxy group, or (b) converting in a cycloaliphatyloxy- or -mercapto-4-Y-3-quinolinecarboxylic acid in which Y is reactively converted oxo or hydroxy, or a functional acid derivative thereof, more particularly such of the formula

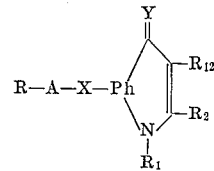

in which Y is functionally converted oxo or thiono, or in case $R_1$ is hydrogen, Y is reactively esterified hydroxy or mercapto, preferably halogeno, and $R_{12}$ is free or functionally converted carboxy, Y into oxo or hydroxy, or (c) etherifying a 4-hydroxy-3-quinolinecarboxylic acid containing in the benzene nucleus at least one hydroxy or mercapto group, or a functional derivative thereof, with a cycloaliphatic alcohol or mercaptan, one of which reactants is reactively esterified, more particularly reacting compounds of the formulae

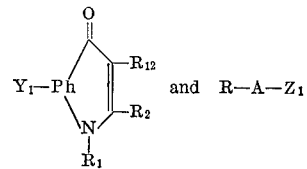

or an ester of the compounds in which $R_1$ is hydrogen, wherein one of $Y_1$ and $Z_1$ is hydroxy or mercapto and the other, advantageously $Z_1$, is reactively esterified hydroxy or $Y_1$ is hydroxy or mercapto and $R—A—Z_1$ together is cycloalkenyl or cycloalkyl-lower alkenyl or -alkylidene, or (d) ring-closing a (cycloaliphatyloxy- or -mercapto-o-aminobenzoyl)-acetic acid or a functional derivative thereof, containing a lower alkanoyl residue either at the amino group or the acetic acid moiety, more particularly such of the formula

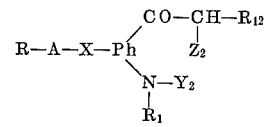

in which one of $Y_2$ and $Z_2$ is hydrogen and the other is lower alkanoyl, or (e) converting in a cycloaliphatyloxy- or -mercapto-4-hydroxy-3-$R_{13}$-quinoline or a 1-substituted tautomer thereof, wherein $R_{13}$ is a group capable of being converted into a free or functionally converted carboxy group, more particularly such of the formula

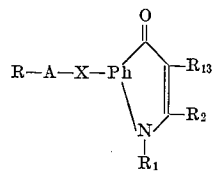

in which $R_{13}$ is a group capable of being converted into free or esterified carboxy, carbamoyl, hydrazinocarbonyl or cyano, $R_{13}$ into such a group, or (f) dehydrogenating a partially hydrogenated cycloaliphatyloxy- or -mercapto-4-hydroxy-3-quinolinecarboxylic acid or a functional derivative thereof, more particularly such of the formula

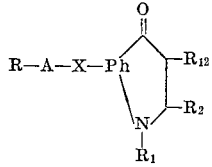

and, if desired, converting any resulting compound into another compound within the scope of the invention.

A reactive functional acid derivative mentioned under items (a) to (d) and (f) is, for example, an ester, preferably a lower or higher alkyl or aralkyl ester, e.g. the methyl, ethyl n-propyl, butyl, decyl or benzyl ester, furthermore a halide, anhydride unsubstituted or alkyl- or aralkyl-substituted amide or hydrazide or the nitrile. A reactive 4-derivative mentioned under item (b) is preferably derived from the 4-hydroxy-compound, i.e. a reactive ester thereof, such as that of a hydrohalic lower alkane or benzene sulfonic acid, e.g. hydrochloric, hydrobromic, hydriodic, methane, ethane or p-toluene sulfonic acid, but may also be a diazo grouping. A functionally converted oxo or thiono group Y is for example, such of an unsubstituted or substituted imine, oxime, hydrazone, semicarbazone or ketal, the latter preferably derived from al ower alkylene glycol or thioglycol. A reactive ester of the alcohol mentioned under item (c) is, for example, such derived from a hydrohalic, lower alkane or benzene sulfonic acid, e.g. those mentioned under (b). Said reactant, preferably R—A—$Z_1$, may also be a diazo compound. A group capable of being converted according to (e) into free or esterified carboxy, carbamyl, hydrazinocarbonyl or cyano, is preferably an acyl-, acyloxy-, carboxy- or haloformyl, e.g. lower alkanoyl- or alkanoyloxyformyl, trihalomethyl, α-hydroxy- or oxoalkyl, advantageously a hydroxy- or oxomethyl group, or a metal or halogen atom.

The above-mentioned reactions are carried out according to standard methods, e.g. according to the classical Gould-Jacobs or Camps synthesis, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents usually must not be used in reaction (a), which advantageously is carried out at an elevated temperature, preferably between about 240 and 260°, but may be used in the reaction (c) or (d), in order to eliminate the acid or water formed. For the former purpose they are basic agents, for example, alkali or alkaline earth metal carbonates, or organic nitrogen bases, such as pyridine or collidine, advantageously aliphatic tertiary amines, such as tri-lower alkylamines, e.g. triethylamine, and for the latter purpose the usual acidic or preferably basic dehydrating agents, e.g. zinc or aluminum halides, phosphorus oxyhalides or polyphosphoric acid, as well as alkali metal amides or advantageously alkoxides respectively. The liberation of a hydroxy or keto group according to reaction (b) is advantageously performed with hydrolyzing agents, for example, acidic agents, such as aqueous mineral or carboxylic acids, such as hydrochloric or acetic acid, or bases, e.g. alkali metal hydroxides, if desired in the presence of solvents, such as lower alkanols and/or desulfurizing agents, e.g. lead or mercuric oxide. An imino group Y (which is an amino group in the 1-unsubstituted starting material) may also be converted into oxo or hydroxy via the diazonium salt, i.e. with the use of nitrous acid or its salts in acidic media. The formation of a free or correspondingly converted carboxy group according to reaction (e) depends on the starting material selected. Such containing an acyl-, acyloxy- or haloformyl group may be subjected to hydrolysis, e.g. with aqueous mineral acids or alkali metal hydroxides, alcoholysis, e.g. with lower or higher alkanols and/or alkali metal alkoxides, ammonolysis, aminolysis or hydrazinolysis, that containing a trihalomethyl group to hydrolysis or alcoholysis, that containing a carboxyformyl group to decarboxylation, e.g. by pyrolysis, that containing a hydroxy- or oxoalkyl group to oxidation, e.g. with the use of hydrogen peroxide, alkali metal hypohalites, chromates or permanganates, chromic, cupric or ferric salts, e.g. the halides or sulfates, mercuric, manganese or silver oxide, in acidic or alkaline media (which also comprises the haloform and Schmidt reaction), that containing a metal atom to reaction with carbon dioxide, carbonic acid esters, isocyanates or cyanogen halides and that containing a halogen atom to metal cyanides and the like The dehydrogenation according to reaction (f) is advantageously carried out with the use of hydrogenation catalysts, e.g. platinum, palladium or nickel catalysts, sulfur, selenium and the like, or by halogenation, e.g. bromination, and dehydrohalogenation, e.g. with the use of alkali metal hydroxides or alkoxides or nitrogen bases, such as pyridine or piperidine.

Resulting compounds of the invention may be converted into each other according to known methods. For example, compounds that contain free hydroxy or mercapto in the isocyclic ring, may be esterified or etherified, e.g. according to reaction (c), advantageously by reaction with haloalkenes in order to obtain corresponding haloalkoxy compounds. Resulting esters, e.g. lower alkyl or aralkyl esters of the acids or lower alkanoic acid esters of the 4-phenols, may be hydrolyzed, for example, with the use of acidic or alkaline hydrolyzing agents, e.g. aqueous alkali metal hydroxides, or transesterified, in the absence or presence of acidic or basic catalysts, e.g. lower alkoxides, or the former converted into acid amides or hydrazides by reaction with ammonia, amines or hydrazines, preferably lower alkylamines or -hydrazines. Free acids that are obtained, may be esterified or amidated, for example, via acid halides or anhydrides (which may be obtained by reaction with thionyl halides or ketenes) or with the use of corresponding dioxo compounds. Resulting 1-unsubstituted compounds may be N-substituted, for example with the use of reactive esters of corresponding alcohols, e.g. those of hydrohalic, sulfuric or sulfonic acids, advantageously in alkaline media or with corresponding epoxides, or 0-substituted with reactive acid derivatives, advantageously with lower alkanoic acid anhydrides or ketenes, to yield the 4-lower alkanoyloxy derivatives.

The compounds of the invention are obtained in the free form or in the form of their salts, depending on the conditions under which the process is carried out; the salts are also included in the present invention. Salts that are obtained can be converted into free acids or bases respectively in known manner, for example, with acids, alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine. Free acids that are obtained, may be converted into ammonium or metal salts, preferably such as ammonia, aliphatic amines, alkali or alkaline earth metals, e.g. lower alkylamines, sodium, potassium, magnesium or calcium.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free compound is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the process of the invention that lead to the formation of those compounds indicated above as being specially valuable.

The starting material used is known or, if new, may be prepared according to known methods. For example, that used in reaction (a) may be prepared by condensing a cycloaliphatyloxy- or -mercapto-aniline with a functional lower alkoxyalkylidene-malonic acid derivative, preferably a lower alkyl ester thereof, or by reaction of a corresponding N-cycloaliphatyloxy- or -mercapto-phenyl-N'-aryl-alkanoic acid amidine with a malonic acid derivative, e.g ester or amide. That mentioned under item (b) is prepared analogous to reaction (a) but condensing said malonic acid derivative in the presence, for example, of a halogenating sulfurizing or ketalizing agent, such as a phosphorus oxyhalide or sulfide or a lower alkylene, e.g. ethylene, glycol or thioglycol, in the presence of an acid, e.g. p-toluenesulfonic acid. The starting material mentioned under item (c) may also be obtained according to reaction (a) with the use of a corresponding hydroxy or mercapto compound or its acyl derivative (ester) and, if desired, hydrolyzing any acyl derivative obtained to the desired hydroxy or mercapto compound; in case $Y_1$ stands for reactively esterified hydroxy, fluorine is preferred. The starting material used in reaction (d) may either be prepared by acylation of the corresponding primary or secondary aniline or by reaction of the corresponding anthranilic acid ester or halide with an alkali metal salt of an alkanoyl-acetic acid derivative, e.g. sodium ethyl acetoacetate. The starting material mentioned under item (e) may be prepared analogous to the Camps reaction (d) or introduction of $R_{13}$ according to classical procedures, and that used in reaction (f) by condensation of a corresponding α-unsubstituted β - (o - carbalkoxy - phenylamine)-lower alkanoic acid derivative.

The compounds of the invention can be used, for example in the form of veterinary compositions, animal feedstuffs or additives to feedstuffs, which are a further object of the present invention. The former contain said compounds in conjunction or admixture with inorganic or organic, solid or liquid pharmaceutical excipients suitable especially for enteral administration. Suitable excipients are substances that do not react with the compounds of the invention, for example, water, gelatine, gums, sugars, e.g. lactose, glucose or sucrose, starches, e.g. cornstarch or arrowroot, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They are prepared by conventional methods and contain about 0.1 to 75%, more particularly, 1 to 50%, of the active ingredient.

The feedstuffs and additives for feedstuffs or for the drinking water contain the compounds of the invention together with conventional extenders, diluents and/or nutrients, such as sucrose, glucose, molasses, fermentation residues, cornmeal, ground and rolled oats, wheat shorts and middlings, meat scrap, oil cake, soybean and fish meal, alfalfa, clover, grass clippings and the like, mineral supplements, such as bone meal, calcium carbonate, iodized salt and the like, vitamins, such as vitamins A, B, C and D, and other suitable substances, such as preservants, e.g. benzoic acid. They contain the compounds of the invention in an amount ranging between about 0.0001 and 0.1% preferably between about 0.001 and 0.02%, whereas the additives may contain the pure substances, when used, for example, for the drinking water, but usually contain between about 1 and 75%, preferably 1 and 50%, thereof. The amount of the compounds of the invention administered via the veterinary compositions or the drinking water corresponds to that given with the medicated feedstuffs shown above. The veterinary compositions, feedstuffs and additives may contain one or more than one of other therapeutically valuable substances, for example, sulfonamides, especially N'-(6-chloro-2-pyrazinyl)-sulfanilamide, or N'-(2-quinoxalinyl)-sulfanilamide, but also N'-(2,6-dimethoxy-4-pyrimidyl)-sulfanilamide,
N'-(5-ethyl-1,3,4-thiadiazol-2-yl)-sulfanilamide,
N'-(5-methyl-3-isoxazolyl)-sulfanilamide, N'(6-methoxy-3-pyridazinyl)-sulfanilamide and the N'-acetyl derivative thereof, N' - (4 - methyl-2-pyrimidinyl)-sulfanilamide, N' - (2,6-dimethyl-4-pyrimidinyl)-sulfanilamide, N'-(5-methyl-1,3,4-thiadiazol-2-yl)-sulfanilamide, N'-(6-chloro-3-pyridazinyl)-sulfanilamide and the sodium salt thereof, N'-(2-phenyl-3-pyrazolyl)sulfanilamide, N'-(2 - phenyl - 5 - methyl-3-pyrazolyl)-sulfanilamide and the like, arsenic derivatives, e.g. 3-nitro - 4 - hydroxyphenylarsonic acid or arsanilic acid, antibiotics, such as penicillin, e.g. procaine penicillin, streptomycin, aureomycin, terramycin, tetracyclines, e.g. oxytetracycline, or chlortetracycline, bacitracines, e.g. zinc or manganese bacitracin or bacitracin methylene disalicylate, anti-parasitic agents, e.g. methyl 4-acetamino-2-ethoxy-benzoate, 2-amino-5-nitrothiazole, 1 - (5-nitro-thiazolyl-2)-2-oxo-tetrahydroimidazole, 6,7 - dialkoxy-4-hydroxy-3-quinolinecarboxylic acids or their lower alkyl esters and/or tranquilizers, such as reserpine, methyl 18 - epi - O - methyl - reserpate, meprobamate and the like, and/or a compound of U.S. Patent No. 3,385,857 or copending application Ser. No. 620,626, filed Mar. 6, 1967, covering quaternary 5-ammoniummethyl-4-amino-2-cycloaliphatyl-pyrimidine salts, e.g. the 2-cyclopropyl- or 2-cyclopropylmethyl-4-amino-5 - (2,4 - dimethylpyridinium)-methyl-pyrimidine chloride hydrochloride.

A preferred additive is such containing about 15% of a compound of the invention, preferably the 6,7-bis-cyclopropylmethoxy - 4 - hydroxy-3-quinolinecarboxylic acid ethyl ester or the 6-cyclopropylmethoxy-7-n-decyloxy-4-hydroxy-3-quinolinecarboxylic acid ethyl ester, advantageously in micronized form, alone or, if desired, in adjunction with some of the following growth promoters, in order to obtain a balanced feed containing between about 0.0001 and 0.01%, preferably about 0.004 to 0.008% of said active ingredients and about (a) 0.0025–0.005% 3-nitro-4-hydroxyphenylarsonic acid,
(b) about 0.005–0.01% arsanilic acid,
(c) about 2–50 g./ton procaine penicillin,
(d) about 4–50 g./ton zinc bacitracin or bacitracin methylene disalicylate,
(e) about 0.0025–0.005% 3-nitro-4-hydroxy phenylarsonic acid and about 0.00004–0.006% bacitracin,
(f) about 0.00006–0.0009% procaine penicillin and 0.003–0.005% bacitracin or zinc bacitracin.

The following examples are intended to illustrate the invention and are not to be construed as being limitations thereon. Temperatures are given in degrees centigrade, and all parts wherever given are parts by weight.

EXAMPLE 1

The mixture of 19.0 g. diethyl (3,4-bis-cyclopropyl-methoxy-phenylamino)-methylene-malonate and 95 ml. diphenyl ether is refluxed for 3 hours. It is cooled, diluted with n-hexane and filtered. The residue is washed with n- hexane and recrystallized from dimethylformamide to yield the 6,7-bis-cyclopropylmethoxy-4-hydroxy-3-quinolinecarboxylic acid ethyl ester of the formula

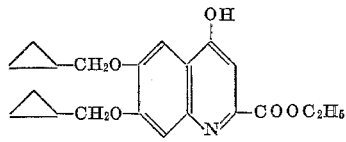

melting at 288–288.5° with decomposition.

The starting material is prepared as follows: To the stirred mixture of 11.5 g. sodium methylate in 200 ml. chol and 40 ml. 95% ethanol, the solution of 12.0 g. sodium hydroxide in 20 ml. water is added and the mixture kept under nitrogen. After 15 minutes the mixture is poured into about 10 times of its volume of acetone. The precipitate formed is filtered off quickly and washed with acetone. After a short period of drying in vacuo, the residue is dissolved in 900 ml. dimethyl sulfoxide and to the solution 46.5 g. cyclopropylmethyl bromide (84.5% pure) are added at 50–55° while under nitrogen. The reaction mixture is allowed to stand for 6 hours at 60° then cooled and poured into ice water. The precipitate formed is filtered off, washed with water and recrystallized from isopropanol to yield the 3,4-bis-cyclopropylmethoxy-nitrobenzene melting at 79–81°.

16.5 g. thereof in 210 ml. anhydrous ethanol are hydrogenated in the presence of 2.0 g. 10% palladium-carsodium hydroxide in 20 ml. water is added and the mixbon. After the hydrogen uptake has ceased, the mixture is filtered, to the filtrate 16.0 g. diethyl ethoxymethylene-malonate are added and the mixture is refluxed for 6 hours under nitrogen. It is filtered, the filtrate evaporated in vacuo and the residue recrystallized from petroleum ether to yield the diethyl (3,4-bis-cyclopropylmethoxy-phenylamino)-methylene-malonate melting at 62–64°.

EXAMPLE 2

The mixture of 10 g. diethyl(3,4-bis-cyclobutylmethoxyphenylamino)-methylene-malonate in 100 ml. diphenyl ether is refluxed for 18 minutes. It is cooled, the solution diluted with petroleum ether, the precipitate formed filtered off, dried in vacuo and recrystallized from dimethyl formamide to yield the 6,7-bis-cyclobutylmethoxy-4-hydroxy-3-quinolinecarboxylic acid ethyl ester of the formula

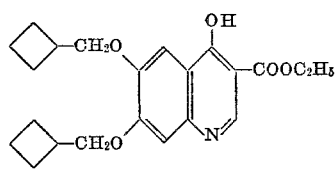

melting at 299–300°. When this compound is dissolved in ethanolic ammonia and heated at 80°–100°, the corresponding amide is obtained.

The starting material is prepared as follows: To the stirred mixture of 11.5 g. sodium methyate in 200 ml. dimethyl formamide, the solution of 15.5 g. 4-nitro-pyrocatechol in 180 ml. dimethyl formamide is added during half an hour and stirring is continued for 1 hour under nitrogen. Hereupon 31.4 g. cyclobutylmethyl bromide are added dropwise during 1 hour and the mixture is heated to 75–80° for 4 hours while stirring. It is cooled, poured onto ice, the solid filtered off and recrystallized from isopropanol to yield the 3,4-bis-cyclobutylmethoxy-nitrobenzene melting at 60–61°.

9.0 g. thereof are hydrogenated in 60 ml. anhydrous ethanol over 0.37 g. platinum oxide. After the absorption of the theoretical amount of hydrogen, it is combined with 6.7 g. diethyl ethoxymethylene-malonate and the mixture refluxed for 3 hours under nitrogen. It is filtered and the filtrate evaporated in vacuo to yield the diethyl (3,4-bis-cyclobutylmethoxy-phenylamino)-methylene-malonate, which is used as such without further purification.

EXAMPLE 3

The mixture of 50 g. diethyl (3,4-bis-cyclopropylmethoxyphenylamino)-methylene-malonate and 600 ml. diphenyl ether is heated for 15 minutes to 250–260°. It is then cooled to room temperature, diluted with petroleum ether, the precipitate formed filtered off and dried at 80° in vacuo. It is recrystallized from dimethyl formamide to yield the 6,7-bis-cyclopropylmethoxy-4-hydroxy-3-quinolinecarboxylic acid ethyl ester melting at 290–293° with decomposition; it is identical with the compound obtained according to Example 1; using the corresponding cyanoacetate in place of the malonate starting material, and following the above procedure, the corresponding nitrile is obtained in place of the ester.

The starting material is prepared as follows: The solution of 22 g. pyrocatechol in 250 ml. dimethyl formamide is added during 20 minutes to the mixture of 17.2 g. of a 56% suspension of sodium hydride in mineral oil and 500 ml. dimethylformamide, while stirring under nitrogen and ice cooling. The mixture is stirred for 1½ hours, whereupon 60.4 g. cyclopropylmethyl bromide are added during 5 minutes while cooling and the mixture is stirred for 42 hours at room temperature. It is then diluted with 100 ml. water and poured into twice of its volume water. The mixture is extracted with methylene chloride, the extract washed with 5% aqueous sodium hydroxide, dried, filtered and evaporated. The residue is distilled and the fraction boiling at 168–172°/15 mm. Hg. collected; it represents the 1,2-bis-cyclopropylmethoxy-benzene.

151 g. thereof are finely ground in a mortar and added portionwise to the solution of 400 ml. concentrated nitric acid in 400 ml. water at 20° while stirring and cooling in an ice bath. After stirring for 3 hours at 10–15° the mixture is diluted with 3 liters water, filtered, the residue washed with water, dried and recrystallized from cyclohexane to yield the 3,4-bis-cyclopropylmethoxy-nitrobenzene melting at 80.5–81.5°.

26.4 g. thereof are hydrogenated in 200 ml. anhydrous ethanol over 1.2 g. platinum oxide at 48 p.s.i. initial pressure. After the hydrogen uptake has ceased, the mixture is combined with 22 g. diethyl ethoxymethylene-malonate and refluxed for 3 hours. After cooling, the catalyst is filtered off and the filtrate evaporated in vacuo. The residue is dried and recrystallized from petroleum ether to yield the diethyl (3,4 - bis-cyclopropylmethoxy-phenylamino)-methylene-malonate melting at 66–67°. Using an equivalent amount of ethyl ethoxymethylene-cyanoacetate in place of the diethyl ethoxymethylene-malonate, and following the above procedure, the corresponding cyanoacetate is obtained.

EXAMPLE 4

The mixture of 22.0 g. diethyl (2-trifluoromethyl-4-cyclopropylmethoxy-phenylamino)-methylene-malonate and 220 ml. diphenyl ether is heated for 20 minutes to 250–260° while stirring. It is cooled to room temperature, diluted with petroleum ether, the precipitate formed filtered off and recrystallized from isopropanol to yield the 6 - cyclopropylmethoxy - 8 - trifluoromethyl-4-hydroxy-3-quinolinecarboxylic acid ethyl ester of the formula

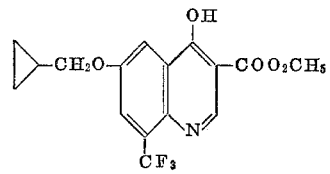

melting at 195–196°.

The starting material is prepared as follows: To the mixture of 20.7 g. 4-hydroxy-2-trifluoromethyl-nitrobenzene in 100 ml. dimethylformamide, 4.3 g. of a 56% suspension of sodium hydride in mineral oil and 100 ml.

dimethylformamide is added while cooling, followed by 15.3 g. cyclopropylmethyl bromide. The mixture is stirred for 15 minutes under nitrogen and poured into excess acetone. The precipitate formed is filtered off and dried in vacuo to yield the 4-cyclopropylmethoxy-2-trifluoromethyl-nitrobenzene melting at 46–48°.

15.7 g. thereof are reduced in 100 ml. ethanol over 0.8 g. platinum oxide at 45 p.s.i. initial pressure. After consumption of the theoretical amount of hydrogen the mixture is combined with 13.0 g. diethyl ethoxymethylenemalonate and refluxed for 3 hours. It is filtered and the filtrate evaporated in vacuo to yield the diethyl (2-trifluoromethyl - 4-cyclopropylmethoxy-phenylamino)-methylenemalonate melting at 55–58°.

EXAMPLE 5

The mixture of 37.6 g. diethyl (2-methyl-4-cyclopropylmethoxy-phenylamino)-methylene-malonate and 300 ml. diphenyl ether is refluxed for 20 minutes. After cooling it is diluted with diethyl ether, the precipitate formed filtered off, dried and recrystallized from dimethylformamide to yield the 6 - cyclopropylmethoxy - 8-methyl-4-hydroxy-3-quinolinecarboxylic acid ethyl ester of the formula

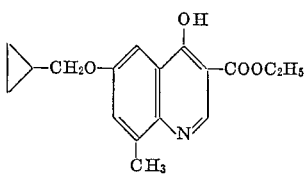

melting at 293.5°. Using the corresponding cyclopropylmethylmercapto compound in place of the diethyl (2-methyl - 4-cyclopropylmethoxy-phenylamino)-methylene malonate, the corresponding thioether is obtained.

The starting material is prepared as follows: To the solution of 38.3 g. 2-methyl-4-hydroxy-nitrobenzene in 200 ml. dimethylformamide, the mixture of 150 ml. dimethylformamide and 10.8 g. of a 56% suspension of sodium hydride in mineral oil is added and the mixture stirred for 4 hours under nitrogen. Hereupon 36.0 g. cyclopropylmethyl bromide are added and the mixture is heated for 4 hours to 75–80°. After cooling it is diluted with water, extracted with methylene chloride, the extract washed with 2% aqueous sodium hydroxide and water, dried, filtered and evaporated to yield the 4-cyclopropylmethoxy-2-methyl-nitrobenzene melting at 39–40°. (Using an equivalent amount of 2-methyl-4-mercapto-nitrobenzene in place of the 2-methyl-4-hydroxy-nitrobenzene acid following the above procedure, the corresponding 4 - cyclopropyl-methylmercapto-2-methyl-nitrobenzene is obtained.)

23.7 g. thereof are hydrogenated in 100 ml. anhydrous ethanol over 1.2 g. platinum oxide at 38 p.s.i. initial pressure. After the hydrogen uptake has ceased, the mixture is combined with 20.4 g. diethyl ethoxymethylene-malonate and refluxed for 3 hours. It is filtered and the filtrate evaporated to yield the diethyl (2-methyl-4-cyclopropylmethoxy - phenylamino)-methylene - malonate melting at 94°.

Reduction of the 4-cyclopropyl-methylmercapto-2-methylnitrobenzene is effected by treatment at 50–60° in ammoniacal solution with hydrogen sulfide.

EXAMPLE 6

The mixture of 12.0 g. diethyl (2-cyclopropylmethoxy-phenylamino)-methylene-malonate and 100 ml. diphenyl ether is refluxed for 45 minutes and then allowed to stand at room temperature for two days. It is poured into 2 liters n-hexane, the precipitate formed filtered off and recrystallized from ethanol to yield the 8-cyclopropyl-methoxy-4-hydroxy-3-quinolinecarboxylic acid ethyl ester of the formula

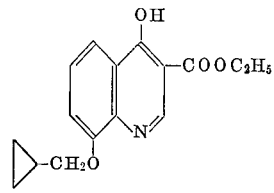

melting at 175–177°.

The starting material is prepared as follows: To the solution of 13.9 g. 2-nitro-phenol in 50 ml. ethanol, the solution of 4.9 g. sodium hydroxide in 20 ml. water is added while cooling in an ice bath. Hereupon 500 ml. dimethyl sulfoxide are added, followed by 18.9 g. cyclopropylmethyl bromide and the mixture is heated to 74° for 12 hours while stirring. After cooling it is poured into 3 liters ice water, the mixture is extracted with diethyl ether, the extract dried, filtered and evaporated. The residue is distilled and the fraction boiling at 120–125°/0.2 mm. Hg collected, to yield the 2-cyclopropylmethoxy-nitrobenzene.

9.0 g. thereof are hydrogenated in 150 ml. anhydrous ethanol over 1.5 palladium-carbon at 45 p.s.i. for two hours. The mixture is filtered, the filtrate combined with 12.0 g. diethyl ethoxymethylene-malonate, refluxed for 6 hours and allowed to stand at room temperature overnight. It is then filtered and the filtrate evaporated to yield the diethyl (2-cyclopropylmethoxy-phenylamino)-methylene-malonate, which is used as such without further purification.

Heating the final product 4-hydroxy-3-quinolinecarboxylic acid ester, obtained according to any of the above Examples 1–5, in refluxing dimethylformamide with an alkyl iodide, such as methyl iodide, ethyl iodide, i-butyl iodide, etc., in the presence of a base, such as powdered anhydrous potassium carbonate, yields the corresponding N-alkyl-4-oxo-compounds.

EXAMPLE 7

Additive for drinking water:

| | G. |
|---|---|
| 6,7 - bis - cyclopropylmethoxy - 4 - hydroxy - 3-quinolinecarboxylic acid ethyl ester | 30.00 |
| Tetrasodium ethylenediamine-tetracetic acid | 30.00 |
| Citric acid | 70.00 |
| Sodium citrate | 50.00 |
| Confectioners sugar | 120.00 |

An aqueous solution containing 0.01% of the active ingredient may be prepared from said additive.

EXAMPLE 8

A poultry feed containing 0.005% of the active ingredient is prepared as follows:

| Feed Formula: | G. |
|---|---|
| 6,7 - bis - cyclopropylmethoxy - 4 - hydroxy-3-quinolinecarboxylic acid ethyl ester | 50.00 |

| | Pounds |
|---|---|
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-methionine | 1.5 |
| Vitamin premix | 10.0 |
| | 2000.3 |

10 lb. of the vitamin composition contain: 16,000,000 I.U. Vit. A, 1,000,000 I.U. Vit. $D_3$, 5,000 I.U. Vit. E acetate, 6 g. Vit. $K_3$, 6 mg. Vit. $B_{12}$, 3 g. riboflavin, 30 g. niacin, 5 g. calcium pantothenate and 100 g. ethoxyquin, made up to 10 lb. with corn meal.

The 6,7-bis-cyclopropylmethoxy-4-hydroxy-3-quinolinecarboxylic acid ethyl ester is first premixed with about 1 kg. of the finely ground feed mixture (which is supplied as such by the manufacturer). The premix is increased to about 25 kg. with the feed and then thoroughly mixed with the main batch in a horizontal mixer.

EXAMPLE 9

A poultry feed containing 0.004 and 0.006% each of two active ingredients:

Premix:

| | G. |
|---|---|
| I. 6,7 - bis - cyclopropylmethoxy - 4 - hydroxy-3-quinolinecarboxylic acid ethyl ester | 40.0 |
| II. 5 - (2,4 - dimethyl - pyridinium) - methyl-4-amino-2-cyclopropylmethyl-pyrimidine chloride hydrochloride | 60.0 |
| III. Confectioners sugar | 50.0 |
| IV. Soybean feed, solvent extracted | 275.0 |

Feed Formula:

| | Pounds |
|---|---|
| Corn meal | 1103.0 |
| Soybean meal, 44% protein | 660.0 |
| Alfalfa meal | 30.0 |
| Dicalcium phosphate | 40.0 |
| Limestone meal | 10.0 |
| Salt | 5.0 |
| Fish meal, 60% protein | 40.0 |
| Stabilized fat | 60.0 |
| Dried whey | 40.0 |
| Manganese sulfate | 0.5 |
| Zinc oxide | 0.3 |
| d,l-methionine | 1.5 |
| Vitamin premix | 10.0 |
| | 2000.3 |

10 lb. of the vitamin composition contain: 16,000,000 I.U. Vit. A, 1,000,000 I.U. Vit. $D_3$, 5,000 I.U. Vit. E acetate, 6 g. Vit. $K_3$, 6 mg. Vit $B_{12}$, 3 g. riboflavin, 30 g. niacin, 5 g. calcium pantothenate and 100 g. ethoxyquin, made up to 10 lb. with corn meal.

The premix is prepared by triturating I and II with III and the mixture is then screened through a 30 mesh screen, U.S. standard sieve size. The screened material is then blended with IV in a mixer, the thoroughly mixed ingredients are added to 999.5 kg. of the above feed formula and the whole is homogenized in a horizontal mixer.

EXAMPLE 10

A poultry feed containing 0.004 and 0.001% each of two active ingredients:

Premix:

| | G. |
|---|---|
| I. 6,7-bis-cyclopropylmethoxy-4-hydroxy-3-quinoline-carboxylic acid ethyl ester | 40.0 |
| II. 5-(2,4-dimethyl-pyridinium)-methyl-4-amino-2-cyclopropylpyrimidine chloride hydrochloride | 10.0 |
| III. Soybean oil | 18.0 |
| IV. Corn gluten feed | 282.0 |

About one third of the amount of IV is combined with I and II, mixed and then screened through a 30 mesh screen, U.S. standard sieve. The remainder of IV is then put into a mixer, III is added and materials mixed to form a uniform dispersion to which the screened material is added and then mixed until uniformity is obtained. The resulting mixture is then added to 999 kg. of the feed formula shown in Example 9 and the whole is homogenized in a horizontal mixer.

EXAMPLE 11

A poultry feed is prepared as follows:

Premix:

| | G. |
|---|---|
| I. 6,7-bis-cyclopropylmethoxy-4-hydroxy-3-quinolinecarboxylic acid ethyl ester | 100.0 |
| II. N'-(2-quinoxalinyl)-sulfanilamide | 125.0 |
| III. Confectioners sugar | 150.0 |
| IV. Soybean feed, solvent extracted | 570.0 |

The premix is prepared by triturating I and II with III and the mixture is then screened through a 30 mesh screen, U.S. standard sieve size; the screened material is then blended with IV in a mixer and the thoroughly mixed ingredients are added to 9999 kg. of the feed formula shown in Example 9 and the whole is homogenized in a horizontal mixer.

The above examples may otherwise be modified so as to obtain a poultry feed containing about 0.001 to 0.02% of the active component shown in Examples 1 to 6 alone or in admixture with another therapeutic agent, e.g. a sulfonamide, which may be present in an amount between about 0.001 and 0.01%, for the intended purposes. In preparing the premix materials (or feed-stuff additives respectively) in the above-identified examples one may, of course, substitute an equivalent amount of other carriers or nutrients respectively, such as cottonseed meal, linseed meal, oatmeal and the like.

EXAMPLE 12

A feed, prepared analogous to that described in Example 8 and containing 6,7-bis-cyclopropylmethoxy-4-hydroxy-3-quinolinecarboxylic acid ethyl ester at a level between 0.004 and 0.008%, is fed to broilers of the breed Peterson male crossed with Arbor Acres female, for 9 days during which time they are exposed to *Eimeria acervulina*. Their weight gain is compared with that of untreated, non-infected or with *Eimeria acervulina* infected birds, whereby each group contains 40 birds. The results are shown in the following table:

| Birds | Percent level in feed | Percent weight gain |
|---|---|---|
| Untreated non-infected | 0 | 100 |
| Untreated infected | 0 | 49 |
| Treated non-infected | 0.008 | 106 |
| Treated infected | 0.006 | 105 |
| Do | 0.004 | 105 |

EXAMPLE 13

The mixture of 3.0 g. 6,7-bis-cyclopropylmethoxy-4-hydroxy-3-quinolinecarboxylic acid ethyl ester, 3.5 ml. hydrazine hydrate (99%) and 50 ml. ethanol, is heated in a sealed tube to 150° for 12 hours. After cooling it is filtered, the residue washed with cold ethanol and recrystallized from ethanol-isopropanol, to yield the 6,7-bis-cyclopropylmethoxy-4-hydroxy-3-quinolinecarboxylic acid hydrazide of the formula

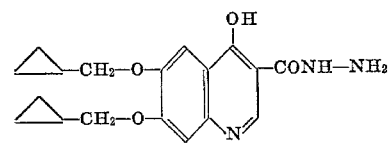

melting over 290°.

EXAMPLE 14

The mixture of 4.0 g. diethyl (3,4-bis-cyclopropylmethoxy-phenylamino)-methylene-malonate and 2.0 g. phosphorus oxychloride, is heated at the steam bath for 4 hours. It is then cooled, treated with ice and chloroform, whereupon the mixture is made slightly alkaline with 2 N aqueous sodium hydroxide. The solid formed is filtered off, washed with benzene and aqueous ethanol and recrystallized from dimethylformamide to yield the 6,7-bis-cyclopropylmethoxy-4-hydroxy-3-quinolinecarboxylic acid ethyl ester, melting at 287 to 288° with the composition;

it is identical with the product obtained according to Example 1.

The initially formed 6,7-bis-cyclopropylmethoxy-4-chloro-3-quinolinecarboxylic acid ethyl ester may also be hydrolyzed with diluted acetic acid after the phosphorus oxychloride has been evaporated in vacuo.

EXAMPLE 15

To the mixture of 2.3 g. 4,8-dihydroxy-3-quinolinecarboxylic acid ethyl ester, 30 ml. dimethylformamide and 0.6 g. sodium methoxide, the solution of 1.4 g. cyclopropylmethyl bromide in 10 ml. dimethyl formamide is added while stirring. The mixture is stirred for 24 hours at room temperature, poured into water and the precipitate formed filtered off. It is recrystallized from ethanol to yield the 8-cyclopropylmethoxy-4-hydroxy-3-quinolinecarboxylic acid ethyl ester melting at 175–177°; it is identical with the product obtained according to Example 6.

The starting material is prepared as follows: The mixture of 2.2 g. 2-amino-phenyl, 4.4 g. diethyl ethoxymethylene-malonate and 50 ml. diphenyl ether is slowly heated to reflux, refluxed for 1 hour and then allowed to stand at room temperature overnight. It is diluted with n-hexane, the precipitate formed filtered off and washed with hexane to yield the 4,8-dihydroxy-3-quinoline carboxylic acid ethyl ester, which is used without further purification.

EXAMPLE 16

The mixture of 3.2 g. ethyl (2-acetylamino-5-cyclopropylmethoxy-benzoyl)-acetate, 50 ml. anhydrous ethanol and 0.6 g. sodium methoxide is stirred for 2 hours at room temperature and refluxed for 2 more hours. It is then evaporated in vacuo, the residue is taken up in water, the mixture quickly neutralized with 2 N-hydrochloric acid and the precipitate formed filtered off. It is washed with water, dried and recrystallized from dimethylformamide to yield the 6-cyclopropylmethoxy-2-methyl-4-hydroxy-3-quinolinecarboxylic acid ethyl ester of the formula

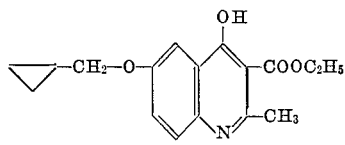

melting at 275–278°.

The starting material is prepared as follows: The mixture of 2.1 g. ethyl (2-amino-5-hydroxy-benzoyl)-acetate, 0.8 g. acetyl chloride, 10 ml. benzene and 1 ml. pyridine is kept on the steam bath for 2 hours, whereupon it is evaporated in vacuo. The residue is taken up in water, extracted with diethyl ether, the extract dried, filtered and evaporated. The residue is taken up in 20 ml. dimethyl sulfoxide, 0.25 g. sodium hydride (in form of a 55% suspension in mineral oil) are added, followed by 1.4 g. cyclopropyl bromide, and the mixture is kept at the steam bath overnight while stirring. After cooling, it is poured into ice water, the mixture extracted with diethyl ether, the extract dried, filtered and evaporated, to yield the ethyl (2-acetylamino-5-cyclopropyl-methoxy-benzoyl)-acetate, which is used as such without further purification.

EXAMPLE 17

To the solution of 2.0 g. 8-cyclopropylmethoxy-4-hydroxy-3-quinolinealdehyde in the minimum amount of 2 N-aqueous sodium hydroxide, aqueous potassium permanganate is added while stirring, until its color persists. The mixture is filtered, the filtrate slightly acidified with hydrochloric acid and the precipitate formed filtered off. It is dried, dissolved in anhydrous diethyl ether and to the solution etheral diazoethane is added until the solution turns yellow. After the addition of one drop acetic acid, the mixture is evaporated in vacuo and the residue recrystallized from ethanol, to yield the 8-cyclopropylmethoxy-4-hydroxy-3-quinoline carboxylic acid ethyl ester melting at 175–177°; it is identical with the compound obtained according to Example 6.

The starting material is prepared as follows: To the mixture of 1.6 g. 4,8-dihydroxy-quinoline in 20 ml. dimethyl formamide, 0.25 g. sodium hydride (in the form of a 55% suspension in mineral oil) are added, followed by 1.4 g. cyclopropylmethyl bromide while stirring. The mixture is kept at the steam bath for 2 hours and overnight at room temperature. It is diluted with water, extracted with methylene chloride, the extract dried, filtered and evaporated. To the residue 2.0 g. sodium hydroxide powder, 3 ml. chloroform and 20 ml. ethanol are added, and the mixture is refluxed for 6 hours. After cooling, it is poured onto ice, neutralized with hydrochloric acid and filtered. The residue is washed with water, dried, and recrystallized from ethanol, to yield the 8-cyclopropylmethoxy-4-hydroxy-3-quinoline-aldehyde, which is used without further purification.

EXAMPLE 18

The suspension of 2.0 g. 8-cyclopropylmethoxy-4-oxo-1,2,3,4-tetrahydro-3-quinolinecarboxylic acid ethyl ester, 20 ml. ethanol, 20 ml. n-butanol and 0.5 g. 10% palladium on charcoal is refluxed for 6 hours. It is filtered hot, the filtrate concentrated in vacuo and the precipitate formed after cooling filtered off, to yield the 8-cyclopropylmethoxy-4-hydroxy-3-quinoline carboxylic acid ethyl ester melting at 175–177°; it is identical with the compound obtained according to Example 6.

The starting material is prepared as follows: The mixture of 3.3 g. ethyl 3-cyclopropylmethoxy-anthranilate, 1.0 g. ethyl acrylate, 2 drops acetic acid and 30 ml. benzene is refluxed overnight and then evaporated. The residue is taken up to 50 ml. anhydrous ethanol, 1.2 g. sodium methylate are added and the whole is refluxed for 4 hours while stirring. The mixture is poured over ice and 20 ml. N-hydrochloric acid and extracted with diethyl ether. The extract is dried, filtered andevaporated to yield the 8-cyclopropylmethoxy-4 - oxo - 1,2,3,4 - tetrahydro-3-quinolinecarboxylic acid ethyl ester, which is used without further purification.

EXAMPLE 19

The mixture of 13 g. diethyl (3-isobutoxy-4-cyclopropylmethoxy-phenylamino)-methylene-malonate and 200 ml. diphenyl ether is heated to 250° for 45 minutes. It is cooled, diluted with n-hexane, filtered and the residue recrystallized from 350 ml. dimethylformamide, to yield the 6-cyclopropylmethoxy-7-isobutoxy - 4 - hydroxy - 3-quinolinecarboxylic acid ethyl ester of the formula

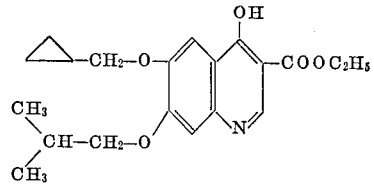

melting at 285° with decomposition.

The starting material is prepared as follows: 500 g. of the crude mixture, containing 65% of the pyrocatechol mono-cyclopropylmethyl ether and 35% of the pyrocatechol bis-cyclopropylmethyl ether, are dissolved in 2 liters toluene and 196 g. of 50% aqueous sodium hydroxide are added. The precipitate formed is filtered off and washed with ethanol-toluene, to yield the sodium salt of the pyrocatechol mono-cyclopropylmethyl ether melting at 165°.

431 g. thereof are suspended in 1 liter toluene and 352 g. benzoyl chloride are added portionwise while stirring and keeping the temperature at 20°. After stirring for 5 hours, the mixture is filtered, the filtrate evaporated in vacuo, the residue distilled and the fraction boiling at 143°/0.25 mm. Hg collected; it represents the 2-cyclopropylmethoxy-phenyl benzoate.

To the solution of 100 g. thereof in 450 ml. glacial acetic acid, 100 ml. fuming nitric acid are added and the mixture is heated for 15 minutes at the steam bath. It is evaporated in vacuo and the residue recrystallized from 500 ml. isopropanol, to yield the 2-cyclopropylmethoxy-5-nitro-phenyl benzoate melting at 99–101°.

The mixture of 69.8 g. thereof, 500 ml. 95% aqueous ethanol and 23 g. 50% aqueous sodium hydroxide is refluxed for 2 hours and evaporated in vacuo. The residue is dissolved in 300 ml. water, the mixture acidified with 42 ml. concentrated hydrochloric acid and extracted with 300 ml. methylene chloride. The extract is washed with water and aqueous sodium bicarbonate, dried, filtered and evaporated. The residue is recrystallized from 200 ml. isopropanol, to yield the 3-hydroxy-4-cyclopropyl-methoxy-nitro-benzene melting at 105–108°.

To the suspension of 35 g. thereof in 500 ml. benzene, 6.4 g. sodium hydroxide pellets are added and the mixture refluxed for 2½ hours, during which time the water formed is collected. The mixture is then filtered, the residue added to 200 ml. dimethylformamide, followed by 1 g. sodium iodide and 30 g. isobutyl bromide. The mixture is heated to 60° for 2 days and then diluted with 500 ml. water. The precipitate formed is filtered off and recrystallized from 250 ml. isopropanol, to yield the 3-isobutoxy-4-cyclopropylmethoxy-nitrobenzene melting at 55–59°.

21.3 g. thereof are hydrogenated in 120 ml. ethanol over 0.44 g. wet 5% palladium on carbon. After the hydrogen uptake has ceased, the mixture is filtered and the filtrate combined with 19.5 g. diethyl ethoxymethylene-malonate. The mixture is refluxed for 3 hours and then evaporated in vacuo, to yield the diethyl (3-isobutoxy-4-cyclopropylmethoxy-phenylamino)-methylene - malonate, which is used without further purification.

EXAMPLE 20

The mixture of 29 g. diethyl (3-cyclopropylmethoxy-4-isobutoxy-phenylamino)-methylene-malonate and 200 ml. diphenyl ether is heated to 252° for 10 minutes. It is cooled, filtered and the residue recrystallized from 400 ml. dimethylformamide to yield the 6-isobutoxy-7-cyclopropylmethoxy-4-hydroxy - 3 - quinoline-carboxylic acid ethyl ester of the formula

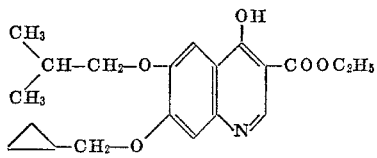

melting at 283°.

The starting material is prepared as follows: To the solution of 55 g. pyrocatechol in 250 ml. anhydrous ethanol, the concentrated solution of 20 g. sodium hydroxide in ethanol is added and the mixture stirred for 1 hour. Hereupon, 1 g. sodium iodide is added followed by 75 g. isobutyl bromide. It is refluxed on the steam bath for 8 hours, diluted with 500 ml. water and extracted with 200 ml. methylene chloride. The extract is dried, filtered, evaporated, the residue distilled and the fraction boiling at 85°/1.5 mm. Hg collected; it represents the pyrocatechol monoisobutyl ether.

To the solution of 80 g. thereof in 300 ml. benzene 20 g. sodium hydroxide are added and the mixture stirred and refluxed for ½ hour. The precipitate formed is filtered off, dried, and again suspended in 300 ml. benzene. To the suspension 70 g. benzoyl chloride are added dropwise while stirring at 25° for 4 hours. The mixture is washed with 200 ml. 2% aqueous sodium hydroxide and 200 ml. water, the solution dried, evaporated, the residue distilled and the fraction boiling at 165°/0.5 mm. Hg collected; it represents the 2-isobutoxy-phenyl benzoate.

To the solution of 65 g. thereof in 650 ml. glacial acetic acid, 65 ml. fuming nitric acid are added and the mixture heated at the steam bath for 20 minutes. It is diluted with 650 ml. water, the precipitate formed filtered off and recrystallized from 400 ml. isopropanol to yield the 2-isobutoxy-5-nitro-phenyl benzoate melting at 76–78°.

The mixture of 55 g. thereof, 200 ml. 95% aqueous ethanol and 15 g. 50% aqueous sodium hydroxide is refluxed for 2 hours and evaporated in vacuo. The residue is dissolved in 300 ml. water, the solution acidified with 40 ml. concentrated hydrochloric acid and extracted with 300 ml. methylene chloride. The extract is stirred overnight with 500 ml. 10% aqueous sodium bicarbonate, the organic layer separated, washed with 100 ml. water, dried, filtered and evaporated, to yield the 3-hydroxy-4-isobutoxy-nitrobenzene melting at 60°.

To the suspension of 29 g. thereof in 200 ml. toluene 5.5 g. sodium hydroxide are added, the mixture refluxed for 1 hour and evaporated in vacuo. The residue is taken up in 100 ml. dimethylformamide and 0.5 g. sodium iodide, followed by 20 g. cyclopropylmethyl chloride, are added. The mixture is stirred at the steam bath for 1 day and diluted with 200 ml. water. The precipitate formed is filtered off and recrystallized from 200 ml. isopropanol to yield the 3-cyclopropylmethoxy-4-isobutoxy-nitrobenzene melting at 71–73°.

22 g. thereof are hydrogenated in 120 ml. ethanol over 0.46 g. wet 5% palladium on carbon. After the hydrogen uptake has ceased, the mixture is filtered and the filtrate combined with 18.1 g. diethyl ethoxymethylene-malonate. The mixture is refluxed for 3 hours and then evaporated in vacuo to yield the diethyl (3-cyclopropylmethoxy-4-isobutoxy - phenylamino) - methylene-malonate which is used without further purification.

EXAMPLE 21

The mixture of 8.0 g. diethyl (3,4-bis-cyclopentoxy-phenylamino)-methylene-malonate and 75 ml. diphenyl ether is refluxed for 5 minutes. After chilling and diluting the mixture with petroleum ether, the precipitate formed is filtered off and recrystallized from diethyl-formamide to yield the 6,7-bis-cyclopentoxy-4-hydroxy-3-quinolinecarboxylic acid ethyl ester of the formula

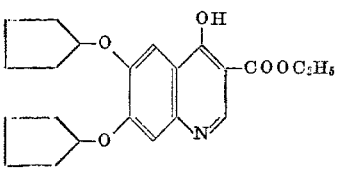

melting at 247° with decomposition.

The starting material is prepared as follows: To the solution of 11.2 g. potassium hydroxide in 60 ml. anhydrous ethanol, 11.0 g. pyrocatechol are added while stirring under nitrogen for 1 hour at 70°. Hereupon 44.6 g. cyclopentyl chloride are added during 10 minutes, and the mixture is refluxed for 3 hours. It is cooled, filtered, the filtrate evaporated in vacuo and the residue taken up in water. The mixture is extracted with diethyl ether, the extract washed with 5% aqueous potassium hydroxide and then with water. It is dried, filtered, evaporated, the residue distilled, and the fraction boiling at 199–202°/16 mm. Hg collected; it represents the pyrocatechol bis-cycopentys ether.

12.5 g. thereof are added portionwise to the mixture of 30 ml. concentrated nitric acid and 30 ml. water at 4° and the mixture is stirred for 4 hours at 0°. It is poured into 120 ml. water, the mixture extracted with methylene chloride, the extract washed with water, dried, filtered and evaporated. The residue is triturated with diethyl ether and recrystallized from aqueous ethanol to yield the 3,4-bis-cyclopentoxy-nitrobenzene, melting at 45–46°.

7.0 g. thereof are reduced in 50 ml. ethanol over 0.2 g. platinum oxide, until the theoretical amount of hydrogen is absorbed. The mixture is filtered, the filtrate combined with 5.0 g. diethyl ethoxymethylene-malonate and refluxed for 3 hours. The mixture is evaporated in vacuo, and the residue, consisting of the diethyl (3,4-bis-cyclopentoxy-phenylamino)-methylene-malonate, is used as such without further purification.

EXAMPLE 22

The mixture of 5.0 g. 6,7-bis-cyclopropylmethoxy-4-hydroxy-3-quinolinecarboxylic acid ethyl ester and 29 ml. 10% aqueous sodium hydroxide is refluxed for 1 hour. After cooling, it is acidified with 6 N hydrochloric acid, the precipitate formed filtered off and washed with water, to yield the 6,7-bis-cyclopropylmethoxy-4-hydroxy-3-quinolinecarboxylic acid of the formula

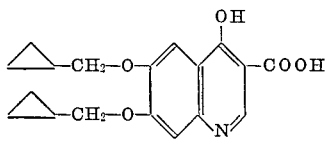

melting at 260–263°.

The mixture of 1.0 g. thereof, 0.507 ml. 6 N aqueous sodium hydroxide and 20 ml. water is heated to 100° for 30 minutes. After cooling, toluene is added to the solution in order to coagulate the corresponding sodium salt formed, which is filtered off, washed with hot toluene and dried in vacuo; it decomposes at about 280°.

EXAMPLE 23

The mixture of 50.0 g. diethyl (4-cyclopropylmethoxy-phenylamino)-methylene-malonate and 400 g. diphenyl ether is heated to 255–260° for 40 minutes. After cooling it is diluted with 150 ml. heptane, the precipitate formed filtered off and washed with hot heptane, to yield the 6-cyclopropylmethoxy-4-hydroxy-3-quinolinecarboxylic acid ethyl ester of the formula

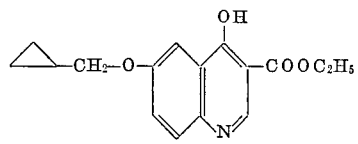

melting at 265–268°.

The starting material used is prepared analogous to the method shown in Example 6.

EXAMPLE 24

According to the process shown in the previous examples, advantageously according to method (a), the following compounds are prepared from equivalent amounts of the corresponding starting materials:

6-n-, i- or tert. butyl-7-cyclopropylmethoxy-4-hydroxy-3-quinolinecarboxylic acid methyl and ethyl ester, 6-n-butyl - 7 - (2,3-dichlorocyclopropyl)-methoxy-4-hydroxy-3-quinolinecarboxylic acid methyl and ethyl ester, 6-dimethylamino - 7-cyclopropylmethoxy-4-hydroxy-3-quinolinecarboxylic acid methyl and ethyl ester, 7-cyclopropylmethoxy - 4 - hydroxy-3-quinolinecarboxylic acid methyl and ethyl ester, 6 - chloro - 7-cyclopropylmethoxy-4-hydroxy-3-quinolinecarboxylic acid methyl and ethyl ester, 7 - chloro - 6-cyclopropylmethoxy-4-hydroxy-3-quinolinecarboxylic acid methyl and ethyl ester, 6-cyclopropylmethoxy - 7 - benzyloxy-4-hydroxy-3-quinolinecarboxylic acid methyl and ethyl ester, 6-cyclopropylmethoxy-7-benzyl-4-hydroxy-3-quinolinecarboxylic acid methyl and ethyl ester, 6 - n - butyl-7-cyclohex-1-enylmethoxy-4-hydroxy-3-quinolinecarboxylic acid methyl and ethyl ester, 6 - cyclobutylmethoxy-7-diethylamino-4-hydroxy-3-quinolinecarboxylic acid methyl and ethyl ester, 6-cyclopropylmethoxy - 7-(2-chloroethoxy)-4-hydroxy-3-quinolinecarboxylic acid methyl and ethyl ester, 6-(2-chloro-cyclopropyl) - methoxy - 7-i-butoxy-4-hydroxy-3-quinolinecarboxylic acid methyl and ethyl ester, 6-cyclopentoxy-7-(3,3,3-trifluoropropoxy)-4-hydroxy-3-quinolinecarboxylic acid methyl and ethyl ester, 6-cyclopropylmethoxy-7- phenoxy - 4 - hydroxy-3-quinolinecarboxylic acid methyl and ethyl ester, 6-n-butyl-7-(2,3-dimethylcyclopropyl)-methoxy - 4 - hydroxy - 3 - quinoline-carboxylic acid methyl and ethyl ester, 7-n-butyl-6-(2-phenoxycyclopropylmethoxy)-4-hydroxy-3-quinolinecarboxylic acid methyl and ethyl ester, 6,7-bis-(2-methyl-cyclopropyl)-methoxy-4-hydroxy-3-quinolinecarboxylic acid methyl and ethyl ester, 2 - methyl-6-cyclopentylmethoxy-7-i-propoxy-4-hydroxy-3-quinolinecarboxylic acid methyl and ethyl ester, 6,7 - bis - (2-cyclopropyl-ethoxy)-4-hydroxy-3-quinolinecarboxylic acid methyl and ethyl ester, 7-(3,4-dichlorocyclopentoxy) - 4 - hydroxy - 3-quinolinecarboxylic acid methyl and ethyl ester, 6-nitro-7-(4-cyclopropyl-butoxy)-4-hydroxy-3-quinolinecarboxylic acid methyl and ethyl ester, 7 - (1-cyclopentenyl)-methoxy-4-hydroxy-3-quinolinecarboxylic acid methyl and ethyl ester, 7-(2-cyclohexenyloxy) - 4-hydroxy-3-quinolinecarboxylic acid methyl and ethyl ester, 6-i-butyl-7-cyclopropylmethylmercapto-4-hydroxy-3-quinolinecarboxylic acid methyl and ethyl ester, 6 - cyclopentylmercapto - 4-hydroxy-3-quinolinecarboxylic acid methyl and ethyl ester, 6-n-butyl-7-(2,4-cyclopentadienyl) - methoxy - 4-hydroxy-3-quinolinecarboxylic acid methyl and ethyl ester, 6 - cyclopropylmethoxy - 7 - benzylmercapto-4-hydroxy-3-quinolinecarboxylic acid methyl and ethyl ester, 6-n-butyl-7-(2,2-dimethylcyclopropylmethoxy) - 4 - hydroxy-3-quinolinecarboxylic acid methyl and ethyl ester, 7-n-butyl-6-(2,2-dimethylcyclopropylmethoxy) - 4 - hydroxy-3-quinolinecarboxylic acid methyl and ethyl ester, 6-n-butyl-7-(1-methylcyclopropylmethoxy) - 4 - hydroxy-3-quinolinecarboxylic acid methyl and ethyl ester, 7-n-butyl-6-(1-methylcyclopropylmethoxy) - 4-hydroxy-3-quinolinecarboxylic acid methyl and ethyl ester, 7-n-butyl-6-(2-methylcyclopropylmethoxy) - 4 - hydroxy-3-quinolinecarboxylic acid methyl and ethyl ester, 6-n-butyl-7-(1-acetoxymethylcyclopropylmethoxy) - 4 - hydroxy-3-quinolinecarboxylic acid methyl and ethyl ester, 7-n-butyl-6-(1-acetoxymethylcyclopropylmethoxy) - 4 - hydroxy-3-quinolinecarboxylic acid methyl and ethyl ester, 6-n-butyl-7-(2-phenoxycyclopropylmethoxy) - 4 - hydroxy-3-quinolinecarboxylic acid methyl and ethyl ester, 7-n-butyl-6-(2-phenoxycyclopropylmethoxy)-4-hydroxy-3-quinolinecarboxylic acid methyl and ethyl ester, 6-n-butyl-7-(2,2-dichlorocyclopropylmethoxy)-4-hydroxy-3-quinolinecarboxylic acid methyl and ethyl ester, 7-n-butyl-6-(2,2-dichlorocyclopropylmethoxy)-4-hydroxy-3-quinolinecarboxylic acid methyl and ethyl ester, 6-n-butyl-7-(1-chloromethylcyclopropylmethoxy)-4-hydroxy-3-quinolinecarboxylic acid methyl and ethyl ester, 7-n-butyl-6-(1-chloromethylcyclopropylmethoxy)-4-hydroxy-3-quinolinecarboxylic acid methyl and ethyl ester, 6-n-butyl-7-(1-methoxymethylcyclopropylmethoxy)-4-hydroxy-3-quinolinecarboxylic acid methyl and ethyl ester, 6-n-butyl-7-(1-methoxymethylcyclopropylmethoxy) - 4 - hydroxy - 3-quinolinecarboxylic acid methyl and ethyl ester, 6 - n - butyl-7-(2-methyl-cyclopropylmethoxy) - 4 - hydroxy-3-quinolinecarboxylic acid methyl and ethyl ester, 7-n-butyl-6-(1-methoxymethylcyclopropylmethoxy) - 4 - hydroxy-3-quinolinecarboxylic acid methyl and ethyl ester, 6-n-butyl-7-(1-phenylcyclopropylmethoxy) - 4 - hydroxy-3-quinolinecarboxylic acid methyl and ethyl ester, 7-n-butyl-6-(1-phenylcyclopropylmethoxy)-4-hydroxy-3-quinolinecarboxylic acid methyl and ethyl ester, 6-n-butyl-7-(1,2-dimethylcyclopropylmethoxy)-4-hydroxy-3-quinolinecarboxylic acid methyl and ethyl ester, 7-n-butyl-6-(1,2-dimethylcyclopropylmethoxy)-4-hydroxy-3-quinolinecarboxylic acid methyl and ethyl ester, 7-n-butyl-6-(2,3-dimethylcyclopropylmethoxy)-4-hydroxy-3-quinolinecarboxylic acid methyl and ethyl ester, 6-n-butyl-7-(1,2,2-trimethylcyclopropylmethoxy)-4-hydroxy-3-quinolinecarboxylic acid methyl and ethyl ester, 7-n-butyl-6-(1,2,2-trimethylcyclopropylmethoxy)-4-hydroxy-3-quinolinecarboxylic acid methyl and ethyl ester, 6-n-butyl-7-(1,2,3-trimethylcyclopropylmethoxy)-4-hydroxy-3-quinolinecarboxylic acid methyl and ethyl ester, 7-n-butyl-6-(1,2,3-trimethylcyclopropylmethoxy)-4-hydroxy-3-quinolinecarboxylic acid methyl and ethyl ester, 6 - n - butyl - 7 - (2 - ethoxycyclopropylmethoxy)-4-hydroxy-3-quinolinecarboxylic acid methyl and ethyl ester, 7-n-butyl-6-(2-ethoxycyclopropylmethoxy)-4-hydroxy-3-quinolinecarboxylic acid methyl and ethyl ester.

EXAMPLE 25

The mixture of 1.0 g. 6,7-bis-cyclopropylmethoxy-4-hydroxy-3-quinolinecarboxylic acid ethyl ester and 20 ml. ethanolic ammonia is heated in a sealed tube to 80–100°. It is then evaporated in vacuo, to yield the 6,7-bis-cyclopropylmethoxy - 4 - hydroxy-3-quinolinecarboxylic acid amide of the formula

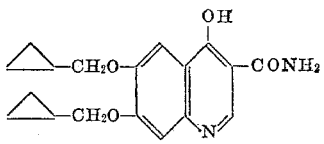

EXAMPLE 26

The mixture of 71.0 g. diethyl (3-cyclopropylmethoxyphenylamino)-methylene-malonate and 525 ml. diphenyl ether is heated for 10 minutes to 255–260° while stirring. The precipitate formed after cooling is filtered off and recrystallized from dimethylformamide, to yield the 7-cyclopropylmethoxy-4-hydroxy-3 - quinolinecarboxylic acid ethyl ester of the formula

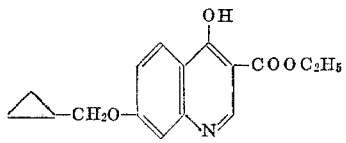

melting above 290°.

The starting material is prepared as follows: The solution of 27.8 g. 3-nitro-phenol in 150 ml. dimethylformamide is added to the mixture of 8.6 g. of 56% sodium hydride in mineral oil and 75 ml. dimethylformamide, at 15–20° while stirring. The mixture is stirred at room temperature for 3 hours, whereupon 36.5 g. cyclopropylmethyl bromide (85%) are added dropwise while stirring and keeping the temperature below 35°. The mixture is then stirred for 4 hours at 75° and allowed to stand overnight. It is poured onto ice, the mixture extracted with methylene chloride, the extract dried, filtered and evaporated. The residue is distilled and the fraction boiling at 124°/0.3 mm. Hg collected; it represents the 3-cyclopropylmethoxy-nitrobenzene.

35 g. thereof are hydrogenated at 3 atmospheres in 150 ml. ethanol over 1.5 g. platinum oxide. After the theoretical hydrogen uptake, 38.9 g. diethyl ethoxymethylenemalonate are added and the whole refluxed for 3 hours. The mixture is then filtered and the filtrate evaporated to yield the diethyl (3 - cyclopropylmethoxyphenylamino)-methylene-malonate, which is used without further purification.

EXAMPLE 27

The mixture of 20.0 g. diethyl (3-chloro-4-cyclopropylmethoxy-phenylamino)-methylene-malonate and 170 ml. diphenyl ether is heated for 10 minutes to 260° while stirring. It is then cooled, diluted with hexane and the precipitate formed recrystallized from dimethylformamide, to yield the 6-cyclopropylmethoxy-7-chloro-4-hydroxy-3-quinolinecarboxylic acid ethyl ester of the formula

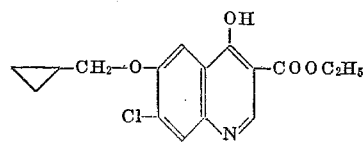

melting above 260°.

The starting material is prepared as follows: The solution of 26.1 g. 2-chloro-4-nitrophenol in 50 ml. dimethylformamide is added to the mixture of 6.5 g. 56% sodium hydride in mineral oil and 75 ml. dimethylformamide, while cooling and stirring the mixture at room temperature for 3 hours. Hereupon 32 ml. cyclopropylmethyl bromide (85%) are added dropwise while cooling. The mixture is then heated to 75° and stirred for 5 hours. It is poured over ice, the mixture extracted with methylene chloride, the extract dried, filtered and evaporated, to yield the 3-chloro - 4 - cyclopropylmethoxy - nitrobenzene melting at 43–47°.

11.3 g. thereof are hydrogenated at 3 atmospheres in 150 ml. ethanol over 0.25 g. platinum oxide at room temperature. After the hydrogen uptake has ceased (10 minutes), 10.8 g. diethyl ethoxymethylene-malonate are added and the whole refluxed for 3 hours. The mixture is then filtered and the filtrate evaporated in vacuo to yield the diethyl (3-chloro - 4 - cyclopropylmethoxyphenylamino)-methylene-malonate, which is used as such without further purification.

EXAMPLE 28

Feed additive containing 50% of the active ingredient.

Formula: G.
6,7-bis-cyclopropylmethoxy - 4 - hydroxy - 3-
 quinolinecarboxylic acid ethyl ester _____ 500.0
Stearyl alcohol _____ 250.0
Glyceryl monostearate _____ 250.0

Procedure

The stearyl alcohol and glyceryl monostearate are melted and the finely divided active ester suspended therein, using a turbo stirrer. The mixture is allowed to congeal on a cooled flaking drum and the flakes are passed through a screen having 0.6 mm. openings.

This additive, releasing the active substance in the lower part of the chicken's intestine, is added to regular poultry feed in such amount as to obtain a concentration of the active ester therein between about 0.001 and 0.005%.

EXAMPLE 29

Feed additive containing 15% of the active ingredient.

Formula: G.
6,7-bis-cyclopropylmethoxy - 4 - hydroxy - 3-
 quinolinecarboxylic acid ethyl ester _____ 75.0
Additive of Example 28 _____ 150.0
Soybean meal (particle size less than 0.6
 mm.) _____ 775.0

Procedure

All the powders are mixed well in a V-shaped mixer and passed through a screen having 0.6 mm. openings.

This additive, releasing the active substance in the upper and lower parts of the chicken's intestine, is added to regular poultry feed in an amount to obtain a concentration of the active ester therein between about 0.001 and 0.005%.

EXAMPLE 30

The mixture of 18.0 g. diethyl (3-benzyloxy-4-cyclopropylmethoxy-phenylamino) - methylene - malonate and 100 ml. diphenyl ether is heated for 7 minutes to about 260° while stirring and using nitrogen to remove the ethanol formed. It is cooled, diluted with hexane, the precipitate formed filtered off, washed with acetone and recrystallized from dimethylformamide, to yield the 6-cyclopropylmethoxy-7-benzyloxy-4-hydroxy - 3 - quinolinecarboxylic acid ethyl ester of the formula

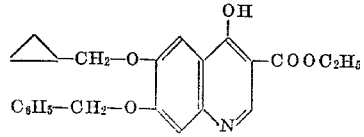

melting at 294–295° with decomposition.

The starting material is prepared as follows: To the stirred solution of 55.0 g. pyrocatechol in 250 ml. anhydrous ethanol, 20.0 g. sodium hydroxide are added while stirring, followed by 86.9 g. cyclopropylmethyl bromide, which is added dropwise during 1 hour. The mixture is stirred and refluxed for 24 hours and concentrated to about ⅓ of the original volume. The concentrate is diluted with water, the mixture extracted with methylene chloride, the extract washed with water, dried, filtered, evaporated, the residue distilled and the fraction boiling at 90–90°/0.4 mm. Hg collected; it represents the pyrocatechol mono-cyclopropylmethyl ether.

The mixture of 28.3 g. thereof, 6.8 g. sodium hydroxide and 100 ml. benzene is stirred and refluxed for ½ hour. After cooling, the precipitate formed is filtered off, resuspending in 300 ml. benzene and to the ice-cooled mixture, 23.9 g. benzoyl chloride are added during ½ hour while stirring, and the mixture is stirred for 4 hours at 25°. It is washed with 200 ml. 2% aqueous sodium hydroxide and 200 ml. water, the organic layer separated, dried, filtered and evaporated. The residue is distilled and the fraction boiling at 173–175°/0.3 mm. Hg collected; it represents the 2-cyclopropylmethoxy-phenyl benzoate.

To the solution of 25.0 g. thereof in 210 ml. glacial acetic acid, 25.2 ml. fuming nitric acid are added during ¼ hour at room temperature while stirring, and the mixture is heated to 100° for 20 minutes. It is poured into 200 ml. ice water, the precipitate formed filtered off and recrystallized from isopropanol to yield the 2-cyclopropylmethoxy-5-nitro-phenyl benzoate melting at 96–99°.

The mixture of 40.0 g. thereof, 150 ml. 95% aqueous ethanol and 11.5 g. 50% aqueous sodium hydroxide is refluxed for 2 hours and evaporated in vacuo. The residue is taken up in 300 ml. water, the solution acidified with 40 ml. concentrated hydrochloric acid and extracted with 300 ml. methylene chloride. The extract is stirred with 500 ml. 10% aqueous sodium bicarbonate for 2 hours and the organic layer separated. The aqueous layer is extracted with methylene chloride, the combined organic solutions dried, filtered and evaporated. The residue is triturated with hexane, to yield the 3-hydroxy-4-cyclopropylmethoxy-nitrobenzene melting at 104–105°.

To the suspension of 10.0 g. thereof in 70 ml. toluene, 1.9 g. sodium hydroxide are added, the mixture refluxed for 1 hour and evaporated. The residue is taken up in 50 ml. dimethylformamide, 0.2 g. sodium iodide are added, followed by 8.2 g. benzyl bromide and the mixture stirred for 20 hours at 100°. It is cooled, diluted with 100 ml. water and, after stirring for 1 hour, it is filtered. The precipitate is recrystallized from isopropanol-hexane, to yield the 3-benzyloxy-4-cyclopropylmethoxy-nitrobenzene melting at 91–92°.

11.5 g. thereof are hydrogenated in 200 ml. anhydrous ethanol over 0.5 g. 5% platinum on carbon at 3 atm. and room temperature. After the theoretical amount of hydrogen has been absorbed, 8.65 g. diethyl ethoxymethylene-malonate are added and the mixture is refluxed for 3 hours while stirring under nitrogen. It is filtered and the filtrate evaporated in vacuo, to yield the diethyl (3 - benzyloxy - 4 - cyclopropylmethoxy - phenylamino)-methylene-malonate as a viscous oil.

EXAMPLE 31

7.5 g. diethyl (3 - cyclopropylmethoxy - 4 - n - propyl-phenyl-amino)-methylene-malonate and 50 ml. diphenyl ether is refluxed for 10 minutes under nitrogen while stirring. After cooling, it is diluted with hexane, the precipitate formed filtered off and recrystallized from dimethylformamide to yield the 6-n-propyl-7-cyclopropyl-methoxy-4-hydroxy-3-quinolinecarboxylic acid ethyl ester of the formula

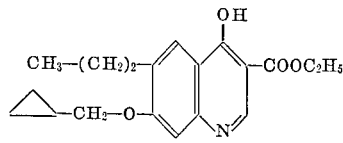

melting at 292–293° with decomposition.

In the analogous manner, the 6-allyl-7-cyclopropyl-methoxy-4-hydroxy-3-quinolinecarboxylic acid ethyl ester, M.P. 293–295° (dec.) and the 8-n-propyl-7-cyclopropyl-methoxy-4-hydroxy-3-quinolinecarboxylic acid ethyl ester, M.P. 192–193°, are obtained.

The starting material is prepared as follows: The mixture of 40.0 g. 3-acetamido-phenol, 34.0 g. allyl bromide, 37.0 g. potassium carbonate and 200 ml. acetone is refluxed for 8 hours while stirring. It is diluted with 400 ml. water, extracted with diethyl ether, the extract washed with 5% aqueous sodium hydroxide and water, dried, filtered and evaporated. The residue is recrystallized from benzene-petroleum ether, to yield the 3-acetamido-phenyl-allyl ether melting at 85–88°.

The mixture of 38.6 g. thereof and 116 g. N,N-dimethyl-aniline is refluxed for 6 hours, cooled and diluted with petroleum ether. The precipitate formed is filtered off, washed with petroleum ether and dissolved in N-aqueous sodium hydroxide. To the solution 0.05 N-sulfuric acid is slowly added, to yield a major first precipitate, which is filtered off and recrystallized from water; it represents the 6-allyl-3-acetamido-phenol melting at 165–166°. The filtrate is acidified with sulfuric acid, the precipitate formed filtered off and recrystallized from water, to yield the 2-allyl-3-acetamido-phenol melting at 147–152°.

The mixture of 19.1 g. 6-allyl-3-acetamido-phenol, 0.5 g. platinum oxide and 200 ml. anhydrous ethanol is hydrogenated at 3 atm. until the theoretical amount of hydrogen is absorbed. It is filtered, the filtrate evaporated in vacuo and the residue recrystallized from isopropanol, to yield the 6-n-propyl-3-acetamido-phenol melting at 178–179°. In the analogous manner, the corresponding 2-allyl compound is reduced to the 2-n-propyl-3-acetamido-phenol, M.P. 148–155°.

The solution of 10.5 g. 6-allyl-3-acetamido-phenol in 50 ml. dimethylformamide is added dropwise to the suspension of 1.9 g. of a 65% suspension of sodium hydride in mineral oil and 100 ml. dimethylformamide while cooling and stirring for 4 hours. Hereupon 7.5 g. cyclopropyl-methyl bromide are added dropwise and the mixture stirred for 8 hours at 80°. It is cooled, poured onto ice, the precipitate formed filtered off, washed with water and recrystallized from benzene hexane to yield the 4-allyl-3-cyclopropylmethoxy-acetanilide melting at 65–67°. In the analogous manner the 4-n-propyl-3-cyclopropylmethoxy-acetanilide, M.P. 70–74°, and the 2-n-propyl-3-cyclopropyl methoxy-acetanilide, M.P. 118–120° are prepared. The mixture of 9.2 g. 4-allyl-3-cyclopropylmethoxyacet-anilide and 100 ml. Claisen's alkali (88 g. potassium hydroxide and 63 ml. water made up to 250 ml. with methanol) is refluxed for 3½ hours while stirring, whereupon 100 ml. water are added and stirring is continued for 1½ hours at room temperature. The mixture is extracted with methylene chloride, the extract dried, filtered, evaporated, the residue distilled and the fraction boiling at 98–100°/0.075 mm. Hg collected; it represents the 4-allyl-3-cyclopropylmethoxy-aniline. Analogously the 4-n-propyl-3-cyclopropylmethoxy-aniline, B.P. 100–120°/0.075 mm. Hg and the 2-n-propyl-3-cyclopropylmethoxy-aniline, B.P. 90–98°/0.05 mm. Hg, are prepared.

The mixture of 5.1 g. 4-allyl-3-cyclopropylmethoxy-aniline, 5.4 g. diethyl ethoxymethylene-malonate and 50 ml. ethanol is refluxed for 3 hours. The precipitate formed after cooling is filtered off and recrystallized from ethanol, to yield the diethyl (4-allyl-3-cyclopropylmethoxyphenylamino)-methylene-malonate, M.P. 75°. Correspondingly, the diethyl (2- or 4-n-propyl-3-cyclopropylmethoxy-phenylamino)-methylene-malonate are prepared.

EXAMPLE 32

The mixture of 20 g. diethyl (3-diethylamino-4-cyclopropylmethoxy-phenylamino)-methylene - malonate and 100 ml. diphenyl ether is refluxed for 10 minutes under a stream of nitrogen. It is cooled, diluted with hexane, the precipitate formed filtered off and recrystallized from ethanol-ethyl acetate, to yield the 6-cyclopropylmethoxy-7 - diethylamino-4-hydroxy-3-quinolinecarboxylic acid ethyl ester of the formula

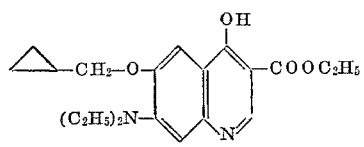

melting at 194–195°.

The starting material is prepared as follows: The mixture of 7.8 g. 2-amino-4-nitro-phenol, 23.8 g. ethyl iodide, 6.2 g. sodium hydroxide and 75 ml. ethanol is heated in a sealed tube to 100° for 8 hours. After cooling, it is filtered, the residue washed with ethanol and the filtrate evaporated. The residue is triturated with water, the mixture extracted with diethyl ether and the extract evaporated. The residue is dissolved in 6 N hydrochloric acid, the solution decolorized with charcoal, filtered, the filtrate made basic with aqueous ammonia and extracted with methylene chloride. The extract is dried, filtered, evaporated and the residue recrystallized from aqueous ethanol, to yield the 2-diethylamino-4-nitro-phenol melting at 91–94°.

The solution of 12.0 g. thereof in 100 ml. dimethylformamide is added to the suspension of 2.4 g. 56% sodium hydride in mineral oil and 50 ml. dimethylformamide. It is stirred for 1 hour at room temperature, whereupon 9.5 g. cyclopropylmethyl bromide are added. The mixture is stirred for 8 hours at 80°, cooled, poured into ice water and extracted with methylene chloride. The extract is dried, filtered, evaporated, the residue distilled and the fraction boiling at 116–124°/0.05 mm. Hg collected; it represents the N,N-diethyl-2-cyclopropylmethoxy-5-nitro-aniline.

The mixture of 11.4 g. thereof, 1.3 g. 5% palladium on charcoal and 100 ml. ethanol is hydrogenated at 3 atm. until the theoretical amount of hydrogen has been absorbed. Hereupon, 10.6 g. diethyl ethoxymethylene-malonate are added, and the mixture refluxed for 3 hours. It is filtered and the filtrate evaporated in vacuo, to yield the diethyl (3-diethylamino-4-cyclopropylmethoxy-phenylamino)-methylene-malonate.

EXAMPLE 33

The mixture of 11.5 g. dimethyl (3-cyclopropylmethoxy-4-n-butyl-phenylamino)-methylene-malonate and 70 ml. diphenyl ether is refluxed for 10 minutes while stirring. After cooling, it is diluted with petroleum ether, the precipitate formed filtered off and recrystallized from dimethylformamide to yield the 6-n-butyl-7-cyclopropylmethoxy-4-hydroxy-3-quinolinecarboxylic acid methyl ester of the formula

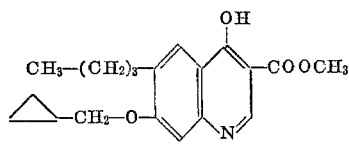

melting at 285–287°.

In the analogous manner, the corresponding ethyl ester, M.P. 291–292° (dec.), is prepared.

The starting material is prepared as follows: To the mixture of 100 g. 3-acetamido-phenol and 210 ml. pyridine, 73.3 g. butyryl chloride are added during ½ hour while stirring and keeping the temperature about 30°. After standing for one day at room temperature, the mixture is filtered and the filtrate evaporated in vacuo. The residue is taken up in acetone, the mixture filtered and the filtrate evaporated. The residue is recrystallized from benzene-hexane to yield the 1-butylryloxy-3-acetamidobenzene melting at 88–89.5°.

41.2 g. thereof are mixed in a mortar with 58.0 g. aluminum chloride and the mixture slowly heated up to about 150° during one hour. After cooling, the melt is broken in a mortar and added to one liter 2 N sulfuric acid. The mixture is stirred for one hour and filtered. The residue is washed with water, dissolved in one liter 10% aqueous sodium hydroxide and the mixture filtered. The filtrate is acidified with 20% hydrochloric acid, the precipitate formed filtered off and washed with water to yield the 2 - butyryl - 5 - acetamido - phenol melting at 115–117°.

The mixture of 40.0 g. thereof, 500 ml. glacial acetic acid and 15 g. 10% palladium on charcoal is hydrogenated at 100 p.s.i. and 50°. After the theoretical amount of hydrogen has been absorbed, it is filtered, the filtrate evaporated, the residue taken up in dimethylformamide, the solution treated with charcoal, filtered and poured into 1.5 liter water. The precipitate formed is filtered off, to yield the 2 - n - butyl - 5 - acetamido - phenol, melting at 143–145°. 27 g. thereof are dissolved in 250 ml. dimethylformamide and the solution is added dropwise to the suspension of 5.6 g. 56% suspension of sodium hydride in mineral oil and 75 ml. dimethylformamide while stirring for one hour and keeping the temperature below 30°. Hereupon, 29 g. 85% cyclopropylmethyl bromide are added and the mixture stirred for 5 hours at 75°. It is evaporated in vacuo, the residue taken up in hot petroleum ether from which the 3-cyclopropylmethoxy-4-n-butyl-acetanilide separates in the cold, M.P. 77–79°.

The mixture of 16 g. thereof and 160 ml. Claisen's alkali (Example 31) is refluxed for 1½ hours. After cooling, it is diluted with 250 ml. water and extracted with methylene chloride. The extract is dried, filtered and evaporated to yield the 3 - cyclopropylmethoxy - 4 - n - butyl - aniline. The mixture of 6.5 g. thereof, 100 ml. ethanol and 6.5 g. diethyl or 5.2 g. dimethyl ethoxymethylene-malonate is refluxed for 3 hours and evaporated in vacuo, to yield the dimethyl or diethyl (3 - cyclopropylmethoxy - 4 - n - butyl-phenyl-amino)-methylene-malonate.

EXAMPLE 34

The mixture of 19.0 g. dimethyl (3,4-bis-cyclopropylmethoxy - phenylamino) - methylene - malonate and 95 ml. diphenyl ether is refluxed for 3 hours. It is cooled, diluted with n-hexane and filtered. The residue is washed with n-hexane and recrystallized from dimethylformamide, to yield the 6,7 - bis - cyclopropylmethoxy - 4 - hydroxy-3-quinolinecarboxylic acid methyl ester of the formula

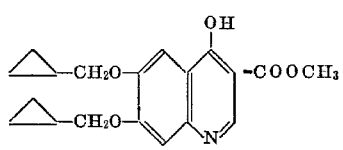

melting at 269–272° with decomposition.

16.5 g. 3,4 - bis - cyclopropylmethoxy - nitrobenzene in 210 ml. anhydrous ethanol are hydrogenated in the presence of 2.0 g. 10% palladium-carbon. After the hydrogen uptake has ceased, the mixture is filtered, to the filtrate 11.0 g. dimethyl methoxymethylene-malonate are added and the mixture is refluxed for 6 hours under nitrogen. It is filtered, the filtrate evaporated in vacuo and the residue recrystallized from petroleum ether to yield the dimethyl (3,4 - bis - cyclopropylmethoxy - phenylamino) - methylene-malonate melting at 68–69°.

EXAMPLE 35

The mixture of 23.5 g. diethyl (3-n-butyl-4-cyclopropylmethoxy - phenylamino) - methylene - malonate and 140 ml. of the eutectic mixture of biphenyl and diphenyl ether is refluxed for 11 minutes (250–260°). It is cooled quickly, diluted with petroleum ether and stirred for 1 hour at room temperature. The precipitate formed is filtered off, washed with petroleum ether and dried in vacuo at 100°, to yield the 6-cyclopropylmethoxy-7-n-butyl-4-hydroxy-3-quinolinecarboxylic acid ethyl ester of the formula

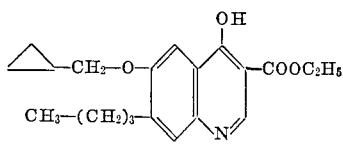

melting at 259–261° with decomposition.

In the analogous manner, the corresponding methyl ester, M.P. 257–259° (dec.) is prepared.

The starting material is prepared as follows: To the mixture of 60 g. 4-acetamido-phenol and 200 ml. pyridine, 44 g. butyryl chloride are added while chilling and stirring. After stirring for 3 hours, it is poured into twice of its volume of water and the precipitate formed filtered off and washed with water, to yield the 4-butyryloxy-acetanilide melting at 145—146°.

The intimate mixture of 65.3 g. thereof and 79 g. anhydrous aluminum chloride is heated slowly to 175° while stirring. After ½ hour mixing, the melt is cooled, ground in a mortar and reheated for 2½ hours to 175°. After cooling, the mixture is added to 500 g. ice and 200 ml. 2 N sulfuric acid while stirring. The precipitate formed is filtered off, washed with water, dissolved in the minimum amount of 5% aqueous sodium hydroxide and the solution filtered. The filtrate is acidified with acetic acid, the precipitate formed filtered off, washed with water and recrystallized from benzene, to yield the 3-butyryl-4-hydroxy-acetanilide melting at 100–102°.

The mixture of 45.8 g. thereof, 500 ml. glacial acetic acid and 15 g. 10% palladium on charcoal is hydrogenated at 500 p.s.i. and 25°. After the theoretical amount of hydrogen has been absorbed, it is filtered, the filtrate evaporated in vacuo, and the residue triturated with n-hexane, to yield the 3 - n - butyl - 4 - hydroxy - acetanilide melting at 83–85°.

The solution of 37.5 g. thereof in 100 ml. dimethylformamide is added during ½ hour to the suspension of 8.2 g. 55.7% of sodium hydride in mineral oil and 100 ml. dimethylformamide while stirring under nitrogen and cooling. After stirring for 1 hour, 43.0 g. cyclopropylmethyl bromide are added during 20 minutes and allowing the temperature to rise to 50°. The mixture is stirred for 7 hours at 75°, it is filtered and the filtrate evaporated in vacuo. The residue is triturated with petroleum ether, to yield the 3 - n - butyl - 4 - cyclopropylmethoxy - acetanilide melting at 65–67°.

The mixture of 54 g. thereof and 540 ml. Claisen's alkali (Example 31) is heated at the steam bath for 7 hours. It is cooled, poured into 1 liter ice water while stirring, and the mixture is extracted with methylene chloride. The extract is dried and evaporated, to yield the 3-n-butyl-4-cyclopropylmethoxy-aniline.

The mixture of 12.5 g. thereof, 100 ml. anhydrous ethanol and 12.3 g. diethyl ethoxymethylene-malonate is refluxed for 3 hours and evaporated in vacuo, to yield the diethyl (3-n-butyl-4-cyclopropylmethoxy-phenylamino)-methylene-malonate, which is used as such without further purification.

EXAMPLE 36

55 g. of diethyl (3 - cyclopropylmethoxy - 4-n - nonylphenylamino)-methylene-malonate are added to the boiling eutectic mixture of diphenyl ether and biphenyl, and the whole is refluxed for 10 minutes. After cooling, it is diluted with pentane, the precipitate formed filtered off and washed with pentane, to yield the 6-n-nonyl-7-cyclopropylmethoxy-4-hydroxy - 3 - quinolinecarboxylic acid ethyl ester of the formula

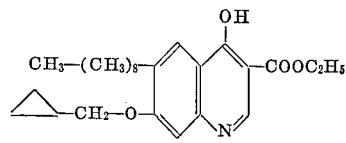

melting at 253° with decomposition.

The starting material is prepared as follows: To the mixture of 60 g. 3-hydroxy-acetanilide and 350 ml. pyridine, 70.6 g. nonanoyl chloride are added while cooling and stirring, and the mixture is allowed to stand for 1 hour at room temperature. It is chilled in an ice bath for ½ hour, filtered and the filtrate evaporated in vacuo. The residue is taken up in benzene, the solution dried, evaporated, and the residue triturated with n-pentane, to yield the 3-nonanoyloxy-acetanilide melting at 43–45°.

The mixture of 98 g. thereof and 103 g. aluminum chloride is heated to 50° for ½ hour, cooled, ground and heated for 2 hours to 160–170°. The cooled, ground material is added to 1 liter 2 N sulfuric acid while stirring for 1½ hours, the precipitate formed is filtered off, washed with water, dissolved in 1 liter 10% aqueous sodium hydroxide, the mixture filtered and the filtrate acidified with 20% hydrochloric acid while chilling. The precipitate is filtered off, washed with water, to yield the 3-hydroxy-4-nonanoylacetanilide melting at 105–107°.

The mixture of 54.5 g. thereof, 500 ml. glacial acetic acid and 18.2 g. of 10% palladium on charcoal is hydrogenated at 500 p.s.i. and 25° until the theoretical amount of hydrogen has been absorbed. It is filtered, the filtrate evaporated in vacuo and the residue recrystallized from benzene, to yield the 3-hydroxy-4-n-nonyl-acetanilide melting at 120–123°.

The solution of 32 g. thereof in 250 ml. dimethylformamide is added during 1 hour to the suspension of 5 g. 56% sodium hydride in mineral oil and 250 ml. dimethylformamide while stirring under nitrogen, and stirring is continued for 2 hours. Hereupon 28 g. 87% cyclopropylmethyl bromide are added during 10 minutes and the mixture stirred for 2 hours at room temperature and for 8 hours at 75°. The mixture is evaporated in vacuo, the residue taken up in hexane, the solution filtered and the filtrate evaporated, to yield the oily 3-cyclopropylmethoxy-4-n-nonyl-acetanilide.

The mixture of 45 g. thereof and 450 ml. Claisen's alkali is refluxed for 3 hours, cooled and poured into 500 ml. ice water. After stirring for ½ hour, the mixture is extracted with methylene chloride, the extract dried and evaporated, to yield the 3-cyclopropylmethoxy-4-n-nonylaniline. It is taken up in 500 ml. ethanol, 25.9 g. diethyl ethoxymethylene-malonate are added and the whole refluxed for 4 hours. The mixture is evaporated in vacuo, to yield the diethyl (3-cyclopropylmethoxy-4-n-nonylphenylamino)methylene-malonate, which is used as such without further purification.

EXAMPLE 37

The mixture of 22 g. 6,7-bis-cyclopropylmethoxy-4-hydroxy-3-quinolinecarboxylic acid ethyl ester, 5.2 g. 56% sodium hydride in mineral oil and 250 ml. dimethylformamide is heated to 85° for 1 hour while stirring under nitrogen. It is cooled to 75° and 15.6 g. ethyl iodide are added during 45 minutes while stirring, and stirring is continued for 2½ hours at 75°. Hereupon another 7.8 g. ethyl iodide are added and the mixture is stirred for 2 hours at 75° and allowed to stand overnight at room temperature. It is filtered, the filtrate evaporated in vacuo, the residue triturated with water and recrystallized from ethyl acetate-hexane, to yield the 1-ethyl-6-,7-bis-cyclopropylmethoxy-4-oxo-3-quinolinecarboxylic acid ethyl ester of the formula

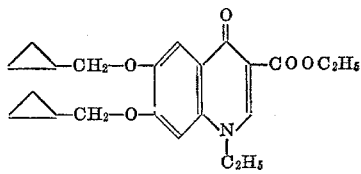

melting at 108–111°.

5.8 g. thereof are saponified in 100 ml. 5% aqueous sodium hydroxide while refluxing for 2½ hours. The mixture obtained is cooled, filtered, the filtrate acidified with hydrochloric acid, the precipitate formed filtered off and recrystallized from dimethylformamide, to yield the corresponding acid melting at 195°.

EXAMPLE 38

The mixture of 15 g. 6-cyclopropylmethoxy-7-isobutoxy-4-hydroxy-3-quinolinecarboxylic acid ethyl ester and 150 ml. n-decanol is refluxed for 30 minutes and the liberated ethanol collected. The mixture is cooled, stirred overnight at room temperature, and the precipitate formed filtered off. It is dissolved in 300 ml. boiling isopropanol, the solution filtered, the filtrate cooled to −10°, and the precipitate formed filtered off, to yield the 6-cyclopropylmethoxy-7-isobutoxy-4-hydroxy - 3 - quinolinecarboxylic acid n-decyl ester of the formula

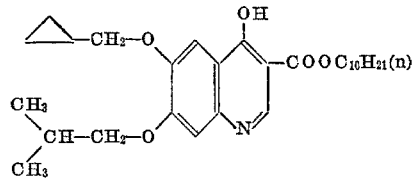

melting at 152°.

In the analogous manner, 17.87 g. 6,7-bis-cyclopropylmethoxy-4-hydroxy-3-quinolinecarboxylic acid ethyl ester is transesterified with 158.3 g. n-decanol at about 206°. The cold mixture obtained is filtered and the residue recrystallized from isopropanol, to yield the 6,7-bis-cyclopropylmethoxy-4-hydroxy-3-quinolinecarboxylic acid n-decyl ester melting at 150–151°.

EXAMPLE 39

The mixture of 1 g. 6,7-bis-cyclopropylmethoxy-4-hydroxy-quinolinecarboxylic acid ethyl ester, 10 g. terphenyl and 20 g. isopropanol is heated in an autoclave to 150° for 2 hours. The mixture is cooled, diluted to twice of its volume with tolueneheptane (1:1), the precipitate formed filtered off and recrystallized from isopropanol, to yield the 6,7-bis-cyclopropylmethoxy-4-hydroxy-3-quinolinecarboxylic acid isopropyl ester of the formula

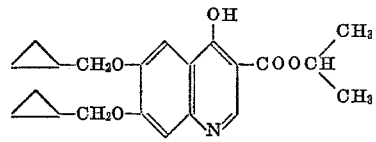

melting at 269°.

In the analogous manner, the corresponding n-butyl ester M.P. 204° and isoamyl ester M.P. 155°, are obtained.

EXAMPLE 40

40 g. diethyl (2-cyclopropylmethoxy-3-n-decyloxyphenyl-amino)-methylene-malonate are added to 400 ml. of the boiling eutectic mixture of diphenyl ether and biphenyl, and the whole is refluxed for 10 minutes. It is cooled rapidly, diluted with 800 ml. heptane and the mixture allowed to stand at room temperature for 2 days. The precipitate formed is filtered off, washed with 200 ml. heptane and recrystallized from aqueous methanol, to yield the 8-cyclopropylmethoxy-7-n-decyloxy-4-hydroxy-3-quinolinecarboxylic acid ethyl ester monohydrate of the formula

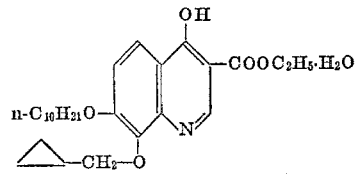

melting at 99–102°.

The mixture of 12 g. thereof and 100 ml. toluene is refluxed on a water trap until no further water is collected. It is evaporated and the residue triturated with diethyl ether, to yield the corresponding anhydrous compound melting at 75–78°.

EXAMPLE 41

To the mixture of 33.5 g. 1-benzyl-6,7-dihydroxy-4-oxo-quinolinecarboxylic acid ethyl ester and 200 ml. dimethylformamide, the suspension of 8.6 g. 56% sodium hydride in mineral oil and 75 ml. dimethylformamide is added while stirring and stirring is continued for 4 hours at room temperature. Hereupon 32 g. 91% cyclopropylmethyl bromide are added and the mixture stirred for 36 hours at 80° under nitrogen. After cooling, it is poured into water, the precipitate formed filtered off, washed with water and dried at 50° in vacuo, to yield the amorphous 1-benzyl-6,7-bis-cyclopropylmethoxy-4-oxo-3-quinolinecarboxylic acid ethyl ester of the formula

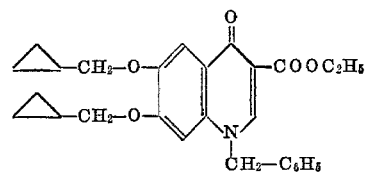

10 g. thereof are taken up in the mixture of 30 ml. ethanol and 30 ml. 20% aqueous sodium hydroxide and the whole is refluxed for 2 hours and evaporated in vacuo. The residue is taken up in hot water, the solution filtered, the filtrate cooled, acidified with hydrochloric acid and the precipitate formed filtered off, to yield the 1-benzyl-6,7-bis-cyclopropylmethoxy-4-oxo-3 - quinolinecarboxylic acid.

The starting material is prepared as follows: The solution of 33.3 g. 6,7-diacetoxy-4-hydroxy-3-quinolinecarboxylic acid ethyl ester in 100 ml. dimethylformamide is added to the suspension of 4.3 g. 56% sodium hydride in mineral oil and 25 ml. dimethylformamide. The mixture is stirred for 24 hours at room temperature, whereupon 17.1 g. benzyl bromide are added dropwise while stirring, and stirring is continued for 8 hours at 80°. It is cooled, diluted with 250 ml. water and the precipitate formed filtered off, to yield the 1-benzyl-6,7-diacetoxy-4-oxo-3-quinolinecarboxylic acid ethyl ester.

The mixture of 35 g. thereof and 250 ml. ethanolic hydrogen chloride is allowed to stand for 1 day at room temperature and concentrated in vacuo. The concentrate is filtered and the residue washed with ethanol, to yield the 1-benzyl - 6,7 - dihydroxy-4-oxo-3-quinolinecarboxylic acid ethyl ester, which is used as such without further purification.

EXAMPLE 42

Through the mixture of 10 g. 6,7-bis-cyclopropylmethoxy-4-hydroxy-3-acetyl-quinoline, 10 g. sodium hydroxide and 100 ml. water, chlorine is bubbled while cooling in an ice bath until saturated. The mixture is allowed to warm up to room temperature and is heated for 10 minutes at the steam bath. It is cooled, acidified with 6 N hydrochloric acid, the precipitate formed filtered off, washed with water and recrystallized from aqueous methanol, to yield the 6,7-bis-cyclopropylmethoxy-4-hydroxy-3-quinolinecarboxylic acid melting at 260–263°; it is identical to the product obtained according to Example 22.

The mixture of 8 g. thereof and 20 ml. thionyl chloride is refluxed for 2 hours and evaporated in vacuo. The residue is taken up in 100 ml. anhydrous ethanol and the mixture allowed to stand 1 day at room temperature. It is concentrated in vacuo, the concentrate filtered and the residue washed with ethanol, to yield the corresponding ethyl ester melting at 288° with decomposition.

The starting material is prepared as follows: The mixture of 11.6 g. 3,4-bis-cyclopropylmethoxy-aniline, 9.0 g. ethyl α-ethoxymethylene-acetoacetate and 100 ml. anhydrous ethanol is refluxed for 5 hours and evaporated. The residue is added to 75 ml. refluxing diphenyl ether and the mixture refluxed for 10 minutes. It is cooled, diluted with hexane, the precipitate formed filtered off and recrystallized from ethanol, to yield the 6,7-bis-cyclopropylmethoxy-4-hydroxy-3-acetyl quinoline.

EXAMPLE 43

The mixture of 10 g. 6,7-bis-cyclopropylmethoxy-4-oxo - 1,2,3,4-tetrahydro-3-quinolinecarboxylic acid ethyl ester, 150 ml. 4-isopropyl-toluene and 5 g. 10% palladium on charcoal is refluxed for 16 hours and filtered hot. The filtrate is concentrated, the precipitate formed filtered off and recrystallized from dimethyl-formamide, to yield the 6,7-bis-cyclopropylmethoxy-4-hydroxy-3-quinolinecarboxylic acid ethyl ester melting at 288° with decomposition; it is identical with the product obtained according to Example 1.

The starting material is prepared as follows: The mixture of 20.2 g. diethyl (3,4-bis-cyclopropylmethoxy-phenylamino)-methylene-malonate, 150 ml. anhydrous ethanol and 2 g. 10% palladium on charcoal is hydrogenated at 3 atm. and room temperature until the theoretical amount of hydrogen has been absorbed. It is filtered hot and the filtrate evaporated, to yield the diethyl (3,4-bis-cyclopropylmethoxy-phenylamino)-methyl-malonate.

20 g. thereof are added to 180 ml. of the boiling eutectic mixture of diphenyl ether and biphenyl, and the whole is refluxed for 30 minutes. It is cooled, diluted with pentane, the precipitate formed filtered off and the residue washed with pentane, to yield the 6,7-bis-cyclopropylmethoxy - 4-oxo-1,2,3,4-tetrahydro-3-quinolinecarboxylic acid ethyl ester.

EXAMPLE 44

18 g. diethyl (3-n-tetradecyloxy-4-cyclopropylmethoxy-phenylamino)-methylene-malonate are added to 110 ml. refluxing eutectic mixture of diphenyl ether and biphenyl, and the reflux is maintained for 8 minutes. The mixture is cooled quickly, diluted with hexane, the precipitate formed filtered off and washed with hexane, to yield the 6 - cyclopropylmethoxy-7-n-tetradecyloxy-4-hydroxy-3-quinolinecarboxylic acid ethyl ester of the formula

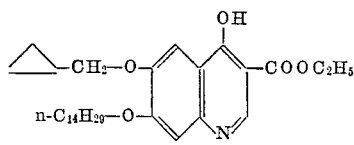

melting at 237–238°.

The starting material is prepared in the manner described in the previous examples from equivalent amounts of the corresponding intermediates. These have the following physical data: 3-n-tetradecyloxy-4-cyclopropylmethoxy-nitrobenzene, M.P. 63–64° and diethyl (3-n-tetradecyloxy - 4 - cyclopropylmethoxy-phenylamino)-methylene malonate, M.P. 56–57°.

EXAMPLE 45

To the eutectic mixture of biphenyl and diphenyl ether, 40 g. diethyl (3-benzoyloxy-4-cyclopropylmethoxy-phenylamino)-methylene-malonate (M.P. 79–81°) are added at 250°, and this temperature is maintained for 20 minutes. It is cooled to 100°, diluted with 400 ml. heptane and stirred for 2 hours at 45°. It is filtered, the residue washed with 100 ml. heptane and triturated with 300 ml. hot acetone, to yield the 6-cyclopropylmethoxy-7-benzoyloxy - 4 - hydroxy-3-quinolinecarboxylic acid ethyl ester of the formula

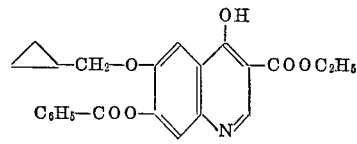

melting at 282°.

The starting material is prepared in the previously described manner from intermediates shown in Example 19.

EXAMPLE 46

32 g. diethyl (3-hydroxy-4-cyclopropylmethoxy-phenylamino)-methylene-malonate (M.P. 121–124°) are added to the eutectic mixture of biphenyl and diphenyl ether at 250°, and the mixture is maintained at this temperature for 15 minutes. It is cooled quickly to 100°, diluted with 100 ml. acetone and stirred for 30 minutes at 25°. The precipitate formed is filtered off, washed with acetone and recrystallized from dimethylformamide in acetone, to yield the 6-cyclopropylmethoxy-4,7-dihydroxy-3 - quinolinecarboxylic acid ethyl ester of the formula

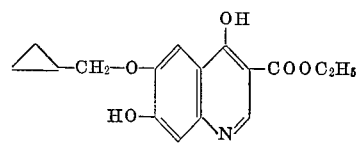

melting at 276°.

The starting material is prepared in the previously described manner from intermediates shown in Example 19.

EXAMPLE 47

The mixture of 8.0 g. diethyl (3-n-decyloxy-4-cyclopropylmethoxy - phenylamino)-methylene-malonate and 48 ml. diphenyl ether is refluxed for 20 minutes under a stream of nitrogen. After cooling, the mixture is diluted with pentane, the precipitate formed filtered off and recrystallized from dimethylformamide, to yield the 6-cyclopropylmethoxy - 7 - n-decyloxy-4-hydroxy-3-quinolinecarboxylic acid ethyl ester of the formula

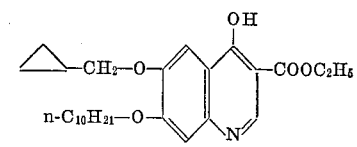

melting at 253–254°.

In the analogous manner, the corresponding methyl ester is prepared, M.P. 254–255°.

The starting material is prepared as follows: To the stirred solution of 55.0 g. pyrocatechol in 250 ml. anhydrous ethanol, 20.0 g. sodium hydroxide are added while stirring, followed by 86.9 g. cyclopropylmethyl bromide, which is added dropwise during 1 hour. The mixture is stirred and refluxed for 24 hours and concentrated to about ⅓ of the original volume. The concentrate is diluted with water, the mixture extracted with methylene chloride, the extract washed with water, dried, filtered, evaporated, the residue distilled and the fraction boiling at 90–94°/0.4 mm. Hg collected; it represents the pyrocatechol mono-cyclopropylmethyl ether.

The mixture of 28.3 g. thereof, 6.8 g. sodium hydroxide and 100 ml. benzene is stirred and refluxed for ½ hour. After cooling, the precipitate formed is filtered off, resuspended in 300 ml. benzene and to the ice-cooled mixture, 23.9 g. benzoyl chloride are added during ½ hour while stirring, and the mixture is stirred for 4 hours at 25°. It is washed with 200 ml. 2% aqueous sodium hydroxide and 200 ml. water, the organic layer separated, dried, filtered and evaporated. The residue is distilled and the fraction boiling at 173–175°/0.3 mm. Hg collected; it represents the 2-cyclopropylmethoxyphenyl benzoate.

To the solution of 25.0 g. thereof in 210 ml. glacial acetic acid, 25.2 ml. fuming nitric acid are added during ¼ hour at room temperature while stirring, and the mixture is heated to 100° for 20 minutes. It is poured into 200 ml. ice water, the precipitate formed filtered off and recrystallized from isopropanol to yield the 2-cyclopropylmethoxy-5-nitro-phenyl benzoate melting at 96–99°.

The mixture of 40.0 g. thereof, 150 ml. 95% aqueous ethanol and 11.5 g. 50% aqueous sodium hydroxide is refluxed for 2 hours and evaporated in vacuo. The residue is taken up in 300 ml. water, the solution acidified with 40 ml. concentrated hydrochloric acid and extracted with 300 ml. methylene chloride. The extract is stirred with 500 ml. 10% aqueous sodium bicarbonate for 2 hours and the organic layer separated. The aqueous layer is extracted with methylene chloride, the combined organic solutions dried, filtered and evaporated. The residue is triturated with hexane, to yield the 3-hydroxy-4-cyclopropylmethoxy-nitrobenzene melting at 104–105°.

The mixture of 18.0 g. thereof, 130 ml. toluene and 3.44 g. sodium hydroxide is stirred and refluxed for 1 hour and evaporated in vacuo. The residue is taken up in 130 ml. dimethylformamide, 0.4 g. sodium iodide and 19.0 g. n-decyl bromide are added and the mixture stirred under nitrogen for 17 hours at room temperature. It is diluted with 500 ml. water, extracted with methylene chloride, the extract washed with water, dried, filtered and evaporated. The residue is recrystallized from n-hexane, to yield the 3-n-decyloxy-4-cyclopropylmethoxy-nitrobenzene, melting at 59–61°.

The mixture of 10.5 g. thereof, 100 ml. anhydrous ethanol and 0.5 g. platinum oxide is hydrogenated at 3 at and room temperature until the hydrogen uptake has ceased. To the mixture, 6.5 g. diethyl ethoxymethylene-malonate are added and the whole is refluxed for 3 hours. The mixture is filtered hot and the filtrate evaporated in vacuo, to yield the diethyl (3-n-decyloxy-4-cyclopropylmethoxy-phenylamino)-methylene-malonate.

EXAMPLE 48

The mixture of 1.0 g. 6-cyclopropylmethoxy-7-n-decyloxy-4-hydroxy-3-quinoline-carboxylic acid ethyl ester and 20 ml. methanol is heated in an autoclave to about 200–250° for 10 minutes and allowed to cool to room temperature. It is evaporated in vacuo and the residue recrystallized from dimethylformamide, to yield the 6-cyclopropylmethoxy-7-n-decyloxy-4-hydroxy-3-quinoline-carboxylic acid methyl ester melting at 254–256°; it is identical with the product obtained according to Example 47.

EXAMPLE 49

The mixture of 4.0 g. diethyl (3-n-decyloxy-4-cyclopropyl - methoxy-phenylamino)-methylene-malonate and 2.0 g. phosphorus oxylchloride, is heated at the steam bath for 4 hours. It is then cooled, treated with ice and chloroform, whereupon the mixture is made slightly alkaline with 2 N aqueous sodium hydroxide. The solid formed is filtered off, washed with benzene and aqueous ethanol and recrystallized from dimethylformamide, to yield the 6-cyclopropylmethoxy-7-n-decyloxy-4-hydroxy-3-quinoline-carboxylic acid ethyl ester, melting at 251 to 253°; it is identical with the product obtained according to Example 47.

The initially formed 6-cyclopropylmethyl-7-n-decyloxy-4-chloro-3-quinolinecarboxylic acid ethyl ester may also be hydrolyzed with diluted acetic acid after the phosphorus oxychloride has been evaporated in vacuo.

EXAMPLE 50

To the solution of 2.0 g. 6-cyclopropylmethoxy-7-decyloxy-4-hydroxy-3-quinolinealdehyde in the minimum amount of 2 N-aqueous sodium hydroxide, aqueous potassium permanganate is added while stirring, until its color persists. The mixture is filtered, the filtrate slightly acidified with hydrochloric acid and the precipitate formed filtered off. It is dried, dissolved in anhydrous diethyl ether and to the solution etheral diazoethane is added until the solution turns yellow. After the addition of one drop acetic acid, the mixture is evaporated in vacuo and the residue recrystallized from dimethylformamide, to yield the 6-cyclopropylmethoxy-7-n-decyloxy-4-hydroxy-3-quinoline carboxylic acid ethyl ester melting at 250–254°; it is identical with the compound obtained according to Example 47.

The starting material is prepared as follows: To the mixture of 1.8 g. 4,6,7-trihydroxy-quinoline in 20 ml. dimethyl formamide, 0.25 g. sodium hydride (in the form of a 55% suspension in mineral oil) are added, followed by 2.23 g. n-decyl bromide while stirring. The mixture is kept at the steam bath for 2 hours and again 0.25 g. sodium hydride are added, followed by 1.4 g. cyclopropylmethyl bromide, and the mixture is allowed to stand overnight at room temperature. It is diluted with water, extracted with methylene chloride, the extract dried, filtered and evaporated. To the residue 2.0 g. sodium hydroxide powder, 3 ml. chloroform and 20 ml. ethanol are added, and the mixture is refluxed for 6 hours. After cooling, it is poured onto ice, neutralized with hydrochloric acid and filtered. The residue is washed with water, dried, and recrystallized from ethanol, to yield the 6 - cyclopropylmethoxy - 1 - n-decyloxy-4-hydroxy-3-quinolinealdehyde, which is used without further purification.

EXAMPLE 51

The suspension of 2.0 g. 6-cyclopropylmethoxy-7-n-decyloxy - 4 - oxo - 1,2,3,4-tetrahydro-3-quinolinecarboxylic acid ethyl ester, 20 ml. ethanol, 20 ml. n-butanol and 0.5 g. 10% palladium on charcoal is refluxed for 6 hours. It is filtered hot, the filtrate concentrated in vacuo, the precipitate formed after cooling filtered off and recrystallized from dimethylformamide, to yield the 6-cyclopropylmethoxy - 7-n-decyloxy-4-hydroxy-3-quinoline carboxylic acid ethyl ester melting at 253–255°; it is identical with the compound obtained according to Example 47.

The starting material is prepared as follows: The mixture of 4 g. ethyl 4-n-decyloxy-5-cyclopropylmethoxy-anthranilate, 1.0 g. ethyl acrylate, 2 drops acetic acid and 30 ml. benzene is refluxed overnight and then evaporated. The residue is taken up in 50 ml. anhydrous ethanol, 1.2 g. sodium methylate are added and the whole is refluxed for 4 hours while stirring. The mixture is poured over ice and 20 ml. N-hydrochloric acid and extracted with diethyl ether. The extract is dried, filtered and evaporated, to yield the 6-cyclopropylmethoxy-7-n-decyloxy-4-oxo-1,2,3,4-tetrahydro - 3 - quinolinecarboxylic acid ethyl ester, which is used without further purification.

EXAMPLE 52

The mixture of 13 g. diethyl (3-cyclopropylmethoxy-4-n-decyloxy-phenylamino)-methylene-malonate and 80 ml. diphenyl ether is refluxed for 20 minutes, diluted with pentane after cooling and filtered. The precipitate is washed with ethanol, acetone and diethyl ether, to yield the 6-n-decyloxy-7-cyclopropylmethoxy - 4 - hydroxy-3-quinoline-carboxylic acid ethyl ester of the formula

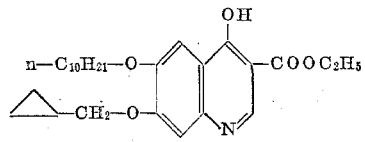

melting at 234–235°.

The starting material is prepared as follows: To the mixture of 22 g. pyrocatechol, 200 ml. acetone and 50 g.

anhydrous potassium carbonate, 46.4 g. n-decyl bromide are added while stirring and the mixture refluxed under nitrogen for 36 hours. It is filtered, the filtrate evaporated in vacuo, the residue distilled and the fraction boiling at 140–144°/0.4 mm. Hg collected; it represents the pyrocatechol mono-n-decyl ether. About the same amount of pyrocatechol di-n-decyl ether is also obtained, B.P. 198–200°/0.3 mm. Hg.

The mixture of 12 g. of the mono ether, 1.9 g. sodium hydroxide and 50 ml. benzene is stirred and refluxed for ½ hour and evaporated. To the residue the mixture of 7.7 g. benzoyl chloride and 150 ml. benzene is slowly added while cooling and the mixture stirred at room temperature for 4 hours. It is washed with 200 ml. 2% aqueous sodium hydroxide and water, dried, filtered and evaporated in vacuo. The residue is distilled and the fraction boiling at 175–180°/0.1 mm. Hg collected; it represents the 2-n-decyloxy-phenyl benzoate.

11.8 g. thereof are dissolved in 100 ml. glacial acetic acid and 12 ml. fuming nitric acid are added dropwise while stirring. The mixture is heated at the steam bath for 20 minutes, then cooled to 30° and slowly added to 125 ml. ice water. The mixture is extracted with methylene chloride, the extract washed with water, dried, filtered and evaporated to yield the 2-n-decyloxy-5-nitrophenyl benzoate.

The mixture of 78 g. thereof, 235 ml. ethanol and 18 g. 50% aqueous sodium hydroxide is refluxed for 2½ hours and evaporated in vacuo. The residue is taken up in 200 ml. water, the solution acidified with 50 ml. concentrated hydrochloric acid and extracted with methylene chloride. The extract is washed with 10% aqueous sodium bicarbonate and water, dried, filtered and evaporated, to yield the 3-hydroxy-4-n-decyloxy-nitrobenzene melting at 53–54°. The mixture of 12.5 g. thereof, 85 ml. toluene, 1.7 g. sodium hydroxide, 0.18 g. sodium iodide and 85 ml. dimethyl formamide is stirred and refluxed for 1 hour. Hereupon 10.2 g. 85% cyclopropylmethyl bromide are added dropwise while stirring, and the mixture stirred at 120° for 24 hours. It is diluted with water, extracted with methylene chloride, the extract washed with water, dried, filtered and evaporated. The residue is recrystallized from n-hexane, to yield the 3-cyclopropylmethoxy-4-n-decyloxy-nitrobenzene melting at 61–62°.

The mixture of 12 g. thereof, 200 ml. anhydrous ethanol and 0.8 g. platinum oxide, is hydrogenated at 3 atm. and room temperature until the hydrogen uptake has ceased. The mixture is combined with 7.4 g. diethyl ethoxymethylene-malonate and the whole stirred and refluxed for 3 hours. The mixture is filtered hot and the filtrate evaporated in vacuo, to yield the diethyl (3-cyclopropylmethoxy - 4 - n-decyloxy-phenylamino)-methylenemalonate.

EXAMPLE 53

Feed additive containing 15% of the active ingredient

Formula: G.
6 - cyclopropylmethoxy-7-n-decyloxy - 4 - hydroxy - 3 - quinolinecarboxylic acid ethyl ester _____ 500.0
Stearyl alcohol _____ 250.0
Glyceryl monostearate _____ 250.0
Soybean meal _____ 2,330.0

Procedure

The stearyl alcohol and stearate are melted and the active ester suspended therein, using a turbo stirrer. The mixture is allowed to congeal on cooled flaking drum and the flakes are passed through a screen having 0.6 mm. openings. They are mixed with soybean meal in a V-shaped mixer and the whole is screened through 0.6 mm. openings.

This additive releasing the active substance in the upper and lower parts of the chicken's intestine is added to regular poultry feed in an amount to obtain a concentration of the active ester therein between about 0.0001 to 0.0075%.

EXAMPLE 54

12.8 g. diethyl (3-n-dodecyloxy-4-cyclopropylmethoxyphenylamino)-methlene-malonate are added to 75 ml. refluxing diphenyl ether and the mixture is refluxed for 30 minutes. It is cooled, diluted with pentane and filtered. The residue is washed with pentane, to yield the 6-cyclopropylmethoxy-7-n-dodecyloxy-4-hydroxy - 3 - quinolinecarboxylic acid ethyl ester of the formula

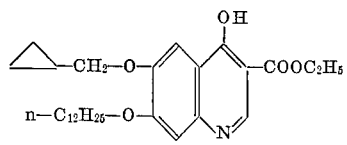

melting at 210–213°.

The starting material is prepared as follows: The mixture of 5.0 g. 3-hydroxy-4-cyclopropylmethoxy-nitrobenzene, 35 ml. toluene, and 0.92 g. sodium hydroxide is stirred and refluxed for 1 hour under nitrogen and evaporated in vacuo. The residue is taken up in 35 ml. dimethylformamide, 0.1 g. sodium iodide and 5.73 g. n-dodecyl bromide are added and the mixture stirred for 40 hours under nitrogen at 120°. It is cooled, diluted with 100 ml. water, extracted with methylene chloride, the extract dried, filtered and evaporated to yield the 3-n-dodecyloxy-4-cyclopropyl-methoxy-nitrobenzene.

The mixture of 9 g. thereof, 150 ml. anhydrous ethanol and 0.5 g. platinum oxide is hydrogenated at 3 atm. and room temperature until the hydrogen uptake has ceased. Hereupon 5.0 g. diethyl ethoxymethylene-malonate are added and the mixture refluxed for 5 hours under nitrogen. It is filtered and filtrate evaporated in vacuo, to yield the diethyl (3-n-dodecyloxy-4-cyclopropylmethoxy-phenylamino)-methylene--malonate melting at 67°.

EXAMPLE 55

Feed additive containing 15% of the active ingredient.

Formula: Kg.
6,7-bis-cyclopropylmethoxy-4-hydroxy-3-quinolinecarboxylic acid ethyl ester ____ 24.75
Lecithin, soybean _____ 1.65
Soybean oil _____ 1.65
Corn gluten feed _____ 136.95

Procedure

The corn gluten feed is ground in a Tornado Mill and passed through a screen with 0.85 mm. openings. 25 kg. thereof are mixed with the micronized active ester and the whole passed through a screen of the same size. The remainder of the feed is mixed with the soybean oil and lecithin, whereupon the premix is added, and the whole is blended for at least 20 minutes until homogeneous. This additive is combined with regular poultry feed, e.g. such described in Examples 8 and 9, in order to obtain a medicated feed containing between about 0.004 and 0.008% of the active ester.

EXAMPLE 56

19.1 g. diethyl (3-cyclopropylmethoxy-4-acetaminophenyl)-methylene-malonate (M.P. 107–108°) are added to 114 ml. boiling eutectic mixture of biphenyl and diphenyl ether and heating is continued for 8 minutes. The solution is cooled, diluted with hexane, filtered and the residue recrystallized from dimethyl-formamide, to yield the 6-acetamino-7-cyclopropylmethoxy-4-hydroxy-3-quinolinecarboxylic acid ethyl ester of the formula

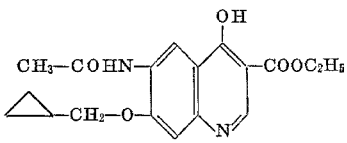

melting at 325–327° with decomposition.

Analogously, its isomer of the formula

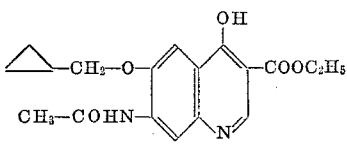

is prepared, M.P. 280–285° (dec.).

The starting material is prepared as follows: To the mixture of 30.8 g. 2-amino-5-nitro-phenol, 70 ml. chloroform and 50 ml. pyridine, 17.1 g. acetyl chloride are added dropwise while stirring, and the mixture is stirred and refluxed for 3 hours. It is cooled, filtered, the residue washed with chloroform and recrystallized from methanol-ethanol, to yield the 2-acetamino-5-nitro-phenol melting at 275–277°.

The solution of 22.2 g. thereof in 250 ml. dimethylformamide is added to the suspension of 4.9 g. 56% sodium hydride in mineral oil and 100 ml. dimethylformamide while stirring under nitrogen and cooling. After stirring for 1 hour at room temperature, 17.9 g. 85% cyclopropylmethyl bromide are added dropwise and the mixture is stirred for 3 hours at 80°. It is cooled, poured onto ice, the precipitate formed filtered off and recrystallized from isopropanol, to yield the 2-cyclopropylmethoxy-4-nitro-acetanilide melting at 113–114°.

The mixture of 14.4 g. thereof, 250 ml. anhydrous ethanol and 1 g. platinum oxide is hydrogenated at 3 atm. and room temperature until the theoretical amount of hydrogen has been absorbed. It is combined with 12.4 g. diethyl ethoxymethylene-malonate, and the whole refluxed for 4 hours. It is filtered, the filtrate evaporated in vacuo and the residue recrystallized from iso-propanol, to yield the diethyl (3-cyclopropylmethoxy-4-acetaminophenylamino)-methylene-malonate melting at 107–108°.

Analogously, the diethyl (3-acetamino-4-cyclopropylmethoxy-phenylamino)-methylene-malonate, M.P. 135–138°, is prepared from the following intermediates:
2-acetamino-4-nitro-phenol, M.P. 185°;
2-cyclopropylmethoxy-5-nitro-acetanilide, M.P. 126–127°.

EXAMPLE 57

The mixture of 10.0 g. diethyl (3-n-octyloxy-4-cyclopropyl-methoxy-phenylamino)-methylene-malonate and 65 ml. diphenyl ether is refluxed for 20 minutes under a stream of nitrogen. After cooling, the mixture is diluted with pentane, the precipitate formed filtered off and recrystallized from dimethylformamide, to yield the 6-cyclopropylmethoxy-7-n-octyloxy-4-hydroxy-3-quinoline-carboxylic acid ethyl ester of the formula

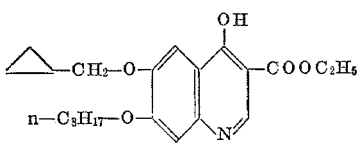

melting at 256–258°.

In the analogous manner, the corresponding methyl ester is prepared, M.P. 258–259.5°.

The starting material is prepared as follows: The mixture of 36 g. 3-hydroxy-4-cyclopropylmethoxy-nitrobenzene, 260 ml. toluene and 6.88 g. sodium hydroxide is stirred and refluxed for 1 hour and evaporated in vacuo. The residue is taken up in 260 ml. dimethylformamide, 0.15 g. sodium iodide and 38 g. n-octyl bromide are added and the mixture stirred under nitrogen for 29 hours at 120° bath temperature. It is diluted with 500 ml. water, extracted with methylene chloride, the extract washed with water, dried, filtered and evaporated. The residue is recrystallized from n-hexane, to yield the 3-n-octyloxy-4-cyclopropylmethoxy-nitrobenzene, melting at 48–49°.

The mixture of 9 g. thereof, 100 ml. anhydrous ethanol and 0.5 g. platinum oxide is hydrogenated at 3 atm. and room temperature until the hydrogen uptake has ceased. To the mixture, 6.1 g. diethyl ethoxymethylene-malonate are added and the whole is refluxed for 3 hours. The mixture is filtered hot and the filtrate evaporated in vacuo, to yield the diethyl (3-n-octyloxy-4-cyclopropylmethoxy-phenylamino)-methylene-malonate.

EXAMPLE 58

The mixture of 3.19 g. 6,7-bis-cyclopropylmethoxy-4-hydroxy-3-quinolinecarboxylic acid ethyl ester, 1.91 g. anhydrous sodium acetate and 80 ml. acetic acid anhydride is slowly heated to the boil while stirring and refluxed for 2 hours and 20 minutes. After cooling, it is filtered, the filtrate poured into 400 ml. water while stirring and the mixture allowed to stand at room temperature for 2 hours. The precipitate formed is filtered off, washed with water, dried and recrystallized from isopropanol with the aid of charcoal, to yield the 6,7-bis-cyclopropylmethoxy-4-acetoxy-3-quinolinecarboxylic acid ethyl ester of the formula

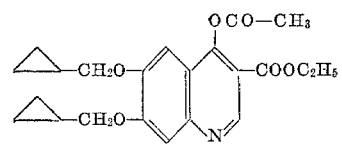

melting at 137–138°.

EXAMPLE 59

To the solution of 26.3 g. 3,4-bis-cyclopropylmethoxy-nitrobenzene in 210 g. of a terphenyl solvent (boiling between 340 and 396°) and 50 ml. toluene, kept under nitrogen, 1 g. platinum oxide is added and the mixture cyclopropylmethoxy-4-hydroxy-3-quinoline-carboxylic acid ethyl ester melting at 280–281°; it is identical with hydrogenated at 65° and 3.4 atm. until the theoretical amount of hydrogen has been absorbed. The mixture is filtered at 40° under nitrogen and the filtrate combined with 21.6 g. diethyl ethoxymethylene-malonate and 200 ml. terphenyl solvent. The mixture is stirred for 30 minutes at 25° under nitrogen and distilled until the toluene is evaporated. It is heated within 10 minutes to 250° and this temperature maintained for 30 minutes. It is rapidly cooled to about 50° and the mixture stirred at this temperature for 30 minutes. It is filtered, the residue washed with 100 ml. hot toluene and dried, to yield the 6,7-bis-the product obtained according to Examples 1, 3, 14, 41 or 43.

EXAMPLE 60

The mixture of 24.9 g. 4,6,7-trihydroxy-3-quinolinecarboxylic acid ethyl ester, 100 ml. phosphorus oxychloride and 20 g. phosphorus pentachloride is refluxed for 3 hours and evaporated in vacuo. This residue is poured onto ice, the mixture extracted with methylene chloride, the extract washed with water, dried, filtered and evaporated. The residue is taken up in the minimum amount of toluene, the solution combined with 29.7 g. cyclopropylmethyl bromide and 100 g. anhydrous potassium carbonate, and the mixture refluxed for 8 hours while stirring. It is filtered hot, the residue washed with hot toluene and the filtrate evaporated in vacuo. The residue is combined with 200 ml. 2 N aqueous sodium hydroxide and the mixture stirred at room temperature for 4 hours. It is slightly acidified with hydrochloric acid, the mixture filtered, the residue washed with water, dried and triturated with hot toluene, to yield the 6,7-bis-cyclopropylmethoxy-4-hydroxy-3-quinoline carboxylic acid ethyl ester melting at about 280° with decomposition.

EXAMPLE 61

The mixture of 2.6 g. 6,7-dihydroxy-4-acetoxy-3-quinoline carboxylic acid ethyl ester, 3 g. cyclopropylmethyl bromide, 10 g. anhydrous potassium carbonate and 100 ml. toluene is refluxed for 8 hours. It is filtered hot, the residue washed with hot toluene and the filtrate evaporated in vacuo. The residue is recrystallized from isopropanol with the aid of charcoal, to yield the 6,7-bis-cyclopropylmethoxy-4-acetoxy - 3 - quinoline carboxylic acid ethyl ester melting at 136–138°; it is identical with the product obtained according to Example 58.

The starting material is prepared as follows: The mixture of 24.9 g. 4,6,7-trihydroxy-3-quinoline carboxylic acid ethyl ester, 200 ml. acetic acid anhydride and 500 ml. pyridine is slowly heated to the boil while stirring and refluxed for 2 hours. It is cooled, poured onto ice, the mixture extracted with methylene chloride, the extract washed with water and evaporated. The residue is taken up in 100 ml. cold 2.7 N ethanolic hydrogen chloride and the mixture stirred at 0–10° for 1 hour. It is poured onto ice water, the precipitate formed filtered off, washed with water and dried, to yield the 6,7-dihydroxy-4-acetoxy-3-quinoline carboxylic acid ethyl ester.

EXAMPLE 62

The stirred mixture of 0.6 g. 6-cyclopropylmethoxy-7-n-decyloxy-4-hydroxy-3-quinoline-carboxylic acid ethyl ester, 1.5 g. anhydrous sodium acetate and 15 ml. acetic acid anhydride is refluxed for three hours and evaporated in vacuo. The residue is triturated with methylene chloride, the solution evaporated and the residue recrystallized from diethyl ether-pentane, to yield the 6-cyclopropylmethoxy-7-n-decyloxy-4-acetoxy-3-quinoline-carboxylic acid ethyl ester of the formula

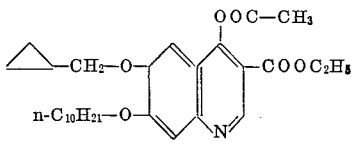

melting at 101.5–102°.

We claim:

1. A compound of the formula

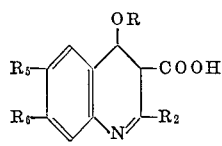

in which R is hydrogen or lower alkanoyl, each of $R_5$ and $R_6$ is cyclopropylmethoxy, lower alkyl or alkoxy having 1 to 20 carbon atoms, at least one of $R_5$ and $R_6$ being cyclopropylmethoxy, and $R_2$ is hydrogen or lower alkyl; a lower alkyl ester or a pharmaceutically acceptable acid addition salt thereof.

2. A compound of claim 1, in which $R_2$ is hydrogen.

3. A compound of claim 2, in which one of $R_5$ and $R_6$ is cyclopropyl-methoxy.

4. A compound of claim 2, in which both $R_5$ and $R_6$ are cyclopropyl-methoxy.

5. A compound of claim 2, in which one of $R_5$ and $R_6$ is alkoxy having 8 to 16 carbon atoms.

6. A compound of claim 2, in which the lower alkyl ester is the ethyl ester.

7. A compound of claim 3, in which the lower alkyl ester is the ethyl ester.

8. A compound of claim 4, in which the lower alkyl ester is the ethyl ester.

9. A compound as claimed in claim 1, and being the 6,7 - bis - cyclopropylmethoxy - 4 - hydroxy - 3 - quinolinecarboxylic acid methyl or ethyl ester or the 4-acetate thereof.

10. A compound as claimed in claim 1 and being the 6-cyclopropylmethoxy - 7 - n - octyloxy - 4 - hydroxy-3 - quinolinecarboxylic acid methyl or ethyl ester or the 4-acetate thereof.

11. A compound as claimed in claim 1 and being the 6 - cyclopropylmethoxy - 7 - n - decyloxy - 4 - hydroxy-3 - quinolinecarboxylic acid methyl or ethyl ester or the 4-acetate thereof.

12. A compound as claimed in claim 1 and being the 6-cyclopropylmethoxy-7-n-dodecyloxy - 4 - hydroxy-3-quinolinecarboxylic acid methyl or ethyl ester or the 4-acetate thereof.

13. A compound as claimed in claim 1 and being the 6 - cyclopropylmethoxy - 7 - n - tetradecyloxy - 4-hydroxy - 3 - quinolinecarboxylic acid methyl or ethyl ester or the 4-acetate thereof.

14. A compound as claimed in claim 1 and being the 6-cyclopropylmethoxy - 7 - n - butyl - 4 - hydroxy-3-quinolinecarboxylic acid methyl or ethyl ester or the 4-acetate thereof.

15. A compound as claimed in claim 1 and being the 7-cyclopropylmethoxy-6-n-decyloxy - 4 - hydroxy-3-quinolinecarboxylic acid methyl or ethyl ester or the 4-acetate thereof.

16. A compound as claimed in claim 9 and being 6,7 - bis - cyclopropylmethoxy - 4 - hydroxy - 3 - quinolinecarboxylic acid ethyl ester.

17. A compound as claimed in claim 9 and being 6,7 - bis - cyclopropylmethoxy - 4 - hydroxy - 3 - quinolinecarboxylic acid ethyl ester 4 - acetate.

18. A compound as claimed in claim 10 and being 6-cyclopropylmethoxy-7-n-octyloxy - 4 - hydroxy-3-quinolinecarboxylic acid ethyl ester.

19. A compound as claimed in claim 11 and being 6-cyclopropylmethoxy - 7 - n -decyloxy - 4 - hydroxy - 3-quinolinecarboxylic acid ethyl ester.

20. A compound as claimed in claim 12 and being 6 - cyclopropylmethoxy - 7 - n - dodecyloxy - 4 - hydroxy-3 - quinolinecarboxylic acid ethyl ester.

References Cited

UNITED STATES PATENTS

| | | |
|---|---|---|
| 2,372,588 | 3/1945 | Carson et al. |
| 3,178,348 | 4/1965 | Bickerton _____ 260—289 X |
| 3,290,315 | 12/1966 | Watson _____ 260—287 |
| 3,377,352 | 4/1968 | Clark et al. _____ 260—287 X |
| 3,397,208 | 8/1968 | Berman et al. _____ 260—287 |
| 3,414,576 | 12/1968 | Cairns et al. _____ 260—287 |

FOREIGN PATENTS

| | | |
|---|---|---|
| 62,566 | 7/1968 | Germany. |

DONALD G. DAUS, Primary Examiner.

U.S. Cl. X.R.

99—2; 260—256.4, 247.2, 268, 270, 442, 544, 578, 286, 471; 424—258

PO-1050
(5/69)

UNITED STATES PATENT OFFICE
CERTIFICATE OF CORRECTION

Patent No. 3,496,184          Dated February 17, 1970

Inventor(s) RENAT HERBERT MIZZONI ET AL

It is certified that error appears in the above-identified patent and that said Letters Patent are hereby corrected as shown below:

Column 23, line 40, delete "75" and insert --- 150 ---.
Column 27, line 8, delete "100" and insert --- 110 ---.
Column 30, line 75, after "6" delete "—".
Column 36, line 31, after "cyclopropylmethoxy -" delete "1" and insert --- 7 ---.
Column 37, line 36, delete "toulene" and insert --- toluene ---.
Column 38, line 43, after "and" insert --- the ---.
Column 40, lines 41 to 42, delete "cyclopropylmethoxy....with"; line 52, after "bis-" insert --- cyclopropylmethoxy-4-hydroxy-3-quinoline-carboxylic acid ethyl ester melting at 280-281°; it is identical with ---.
Column 41, line 11, delete "Erample" and insert --- Example ---; lines 35 to 40, amend the middle of the formula to read:

 ;

lines 45 to 50, amend the right hand side of the formula to read:

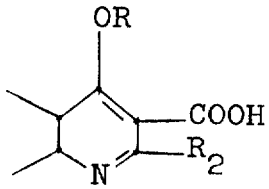

Signed and sealed this 30th day of March 1971.

(SEAL)
Attest:

EDWARD M. FLETCHER, JR.
Attesting Officer

WILLIAM E. SCHUYLER, JR.
Commissioner of Patents